United States Patent
Park et al.

(10) Patent No.: US 11,638,240 B2
(45) Date of Patent: Apr. 25, 2023

(54) METHOD AND DEVICE FOR TRANSMITTING CONTROL INFORMATION IN WIRELESS COMMUNICATION SYSTEM

(71) Applicant: Samsung Electronics Co., Ltd., Suwon-si (KR)

(72) Inventors: Sungjin Park, Suwon-si (KR); Euichang Jung, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/881,330

(22) Filed: May 22, 2020

(65) Prior Publication Data
US 2020/0383105 A1    Dec. 3, 2020

(30) Foreign Application Priority Data

May 24, 2019 (KR) ......................... 10-2019-0061148

(51) Int. Cl.
*H04J 3/00*        (2006.01)
*H04W 72/04*      (2023.01)
*H04W 72/0446*    (2023.01)

(52) U.S. Cl.
CPC ..... *H04W 72/0413* (2013.01); *H04W 72/042* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2018/0324789 A1 | 11/2018 | Park et al. | |
| 2019/0052421 A1* | 2/2019 | Yin | H04L 5/005 |
| 2020/0008156 A1* | 1/2020 | Yin | H04L 1/1858 |
| 2020/0008189 A1* | 1/2020 | Yin | H04W 76/11 |
| 2020/0008225 A1* | 1/2020 | Lee | H04W 72/1273 |
| 2020/0052835 A1* | 2/2020 | Xiong | H04B 7/0632 |
| 2020/0221448 A1* | 7/2020 | Park | H04W 72/042 |

(Continued)

FOREIGN PATENT DOCUMENTS

| | | |
|---|---|---|
| KR | 10-2019-0009670 A | 1/2019 |
| WO | 2016/161629 A1 | 10/2016 |

OTHER PUBLICATIONS

5G; NR; Physical layer procedures for control (3GPP TS 38.213 version 15.5.0 Release 15), ETSI TS 138 213 V15.5.0, Mar. 27, 2019, sections 9.2.1, 9.2.3, 9.2.6.

(Continued)

*Primary Examiner* — Clemence S Han
(74) *Attorney, Agent, or Firm* — Jefferson IP Law, LLP

(57) ABSTRACT

The disclosure relates to a communication technique for convergence of a 5$^{th}$ Generation (5G) communication system for supporting a higher data transmission rate beyond a 4$^{th}$ Generation (4G) system with an IoT technology, and a system therefor. The disclosure may be applied to intelligent services based on a 5G communication technology and an IoT-related technology. A method of a terminal in a wireless communication system is provided. The method includes receiving, from a base station, physical uplink control channel (PUCCH) configuration information including a number of slots for repetition of a PUCCH transmission and a length of a subslot for a PUCCH, receiving, from the base station, downlink control information (DCI), receiving, from the base station, data on a physical downlink shared channel (PDSCH) based on the DCI, and transmitting uplink control information (UCI) on the PUCCH repeatedly based on the number of slots and the length of the subslot.

12 Claims, 14 Drawing Sheets

(56) References Cited

U.S. PATENT DOCUMENTS

| | | | | |
|---|---|---|---|---|
| 2020/0259625 A1* | 8/2020 | Papasakellariou | ... | H04B 7/0639 |
| 2020/0351891 A1* | 11/2020 | Hosseini | ............... | H04L 5/0094 |
| 2021/0058922 A1* | 2/2021 | Han | ..................... | H04L 5/0055 |
| 2021/0274492 A1* | 9/2021 | Yin | ....................... | H04L 1/1861 |
| 2022/0030443 A1* | 1/2022 | Chen | ..................... | H04W 80/02 |
| 2022/0053483 A1* | 2/2022 | Yoshioka | ............. | H04W 72/12 |

OTHER PUBLICATIONS

Oppo, Summary on UCI enhancements for URLLC, R1-1905716, 3GPP TSG RAN WG1 #96bis, Xi'an, China, Apr. 9, 2019, sections 2.1, 2.4.

Oppo, Summary of email discussion [90b-NR-29] on PUCCH resource set, R1-1719972, 3GPP TSG RAN WG1 Meeting 91, Reno, USA, Nov. 18, 2017, section 1.

Nokia et al., Summary of Thursday offline discussion on PUSCH enhancements for NR eURLLC (AI 7.2.6.3), R1-1905815, 3GPP TSG RAN WG1 Meeting #96bis, Xi'an, China, Apr. 15, 2019, section 2.

International Search Report dated Aug. 26, 2020, issued in International Application No. PCT/KR2020/006763.

Extended European Search Report dated May 12, 2022, issued in a counterpart European Application No. 20814699.3.

Samsung: UL Control for URLLC; 3GPP TSG RAN WG1 #97; R1-1906956; EURLLC UL Control, 3rd Generation Partnership Project (3GPP), vol. RAN WG1, No. XP051708991; pp. 1-5. May 3, 2019, Reno, USA.

* cited by examiner

Time

METHOD AND DEVICE FOR TRANSMITTING CONTROL INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0061148, filed on May 24, 2019, in the Korean Intellectual Property Office, the disclosure of which is incorporated by reference herein in its entirety.

BACKGROUND

1. Field

The disclosure relates to a method for transmitting control information in a wireless communication system.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. Therefore, the 5G or pre-5G communication system is also called a "Beyond 4G Network" or a "Post long term evolution (LTE) System". The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an Aspect of the disclosure is to provide a method and device for transmitting control information, which requires a high reliability with a small delay time regardless of a slot boundary and a downlink-and-uplink switching section, when a terminal transmits uplink control information.

Additional aspects will be set forth in part in the description which follows and, in part, will be apparent from the description, or may be learned by practice of the presented embodiments.

In accordance with an aspect of the disclosure, a method of a terminal is provided. The method includes receiving, from a base station, physical uplink control channel (PUCCH) configuration information including a number of slots for repetition of a PUCCH transmission and a length of a subslot for a PUCCH, receiving, from the base station, downlink control information (DCI), receiving, from the base station, data on a physical downlink shared channel (PDSCH) based on the DCI, and transmitting uplink control information (UCI) on the PUCCH repeatedly based on the number of slots and the length of the subslot. A method of a base station of the disclosure for solving the above problem includes transmitting, to a terminal, physical uplink control channel (PUCCH) configuration information including a number of slots for repetition of a PUCCH transmission and a length of a subslot for a PUCCH, transmitting, to the terminal, downlink control information (DCI), transmitting, to the terminal, data on a physical downlink shared channel (PDSCH) based on the DCI, and receiving, from the terminal, uplink control information (UCI) on the PUCCH repeatedly based on the number of slots and the length of the subslot.

In accordance with another aspect of the disclosure, a terminal is provided. The terminal includes a transceiver, and at least one processor configured to receive, from a base station, PUCCH configuration information including a number of slots for repetition of a PUCCH transmission and a length of a subslot for a PUCCH, receive, from the base station, downlink control information (DCI), receive, from the base station, data on a physical downlink shared channel (PDSCH) based on the DCI, and transmit uplink control information (UCI) on the PUCCH repeatedly based on the number of slots and the length of the subslot. A base station of the disclosure for solving the above problem includes a transceiver, and at least one processor configured to transmit, to a terminal, physical uplink control channel (PUCCH) configuration information including a number of slots for repetition of a PUCCH transmission and a length of a subslot for a PUCCH, transmit, to the terminal, downlink control information (DCI), transmit, to the terminal, data on a physical downlink shared channel (PDSCH) based on the DCI, and receive uplink control information (UCI) on the PUCCH repeatedly based on the number of slots and the length of the subslot. According to disclosed embodiments of the disclosure, it is possible to effectively provide a service in a wireless communication system. Specifically, via the method provided in the disclosure, a terminal can detect control information transmitted from a base station, with high reliability in a short time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages, of certain embodiments of the disclosure will be more apparent from the following description taken in conjunction with the accompanying drawings, in which.

Throughout the drawings, like reference numerals will be understood to refer to like parts, components, and structures

DETAILED DESCRIPTION

Figure 1:
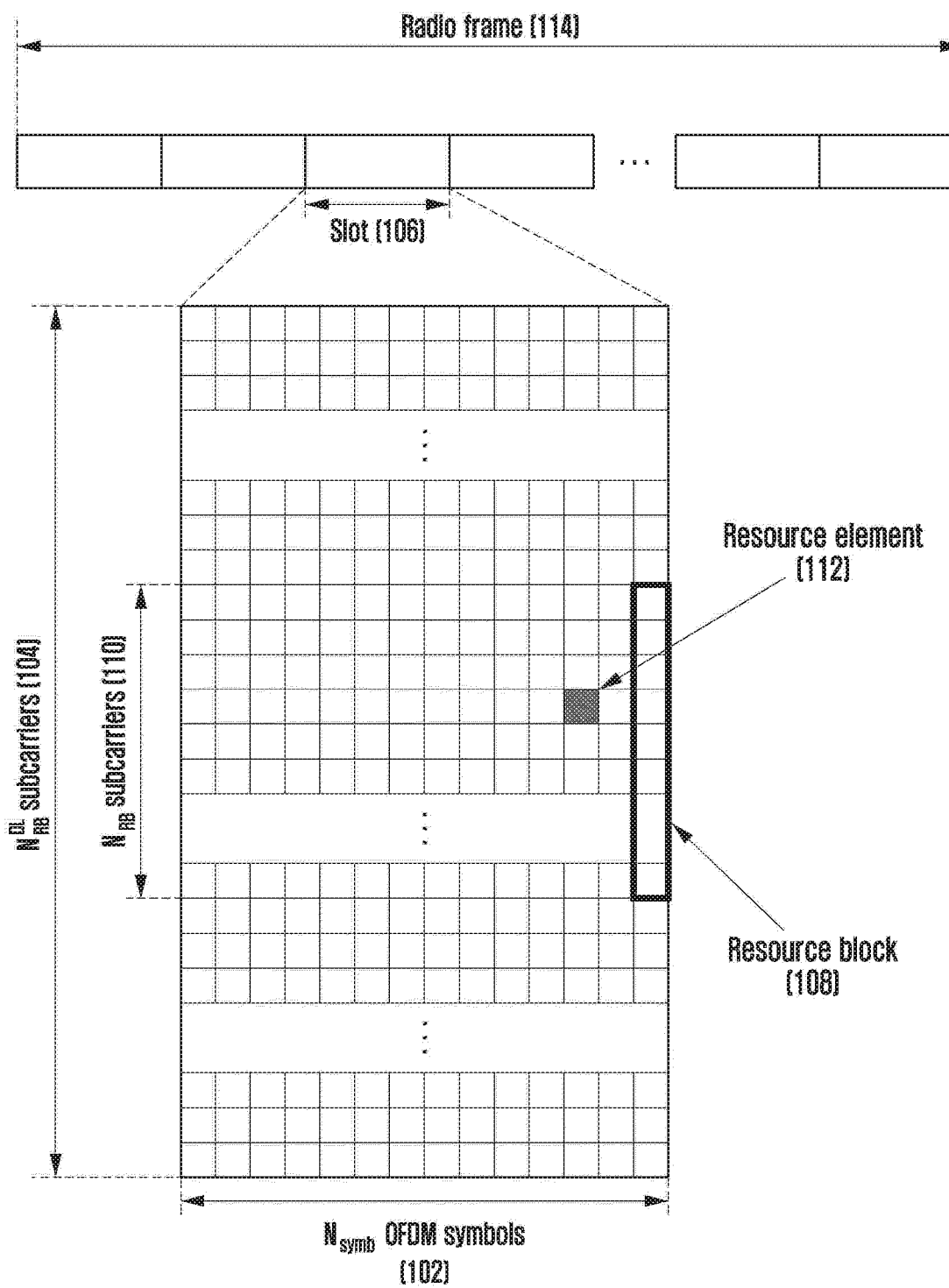
FIG. 1 is a diagram illustrating a transmission structure in a time-frequency domain, that is, a radio resource region of a 5$^{th}$ generation (5G) or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

A wireless communication system has moved away from providing early voice-oriented services, and advances in broadband wireless communication systems that provide high-speed and high-quality packet data services, such as communication standards, for example, 3GPP's high speed packet access (HSPA), long term evolution (LTE) or evolved universal terrestrial radio access (E-UTRA), LTE-advanced (LTE-A), 3GPP2's high rate packet data (HRPD), ultra-mobile broadband (UMB), IEEE's 802.16e, and the like. Further, communication standards for 5G or new radio (NR) are generated based on 5th generation wireless communication system.

In the 5G or NR system, which is a typical example of a broadband wireless communication system, an orthogonal frequency division multiplexing (OFDM) scheme is adopted in downlink (DL) and uplink. More specifically, a cyclic-prefix OFDM (CP-OFDM) scheme is adopted in downlink, and a discrete Fourier transform spreading OFDM (DFT-S-OFDM) scheme is adopted in addition to the CP-OFDM in uplink.

Uplink refers to a radio link via which a terminal (user equipment (UE) or mobile station (MS)) transmits data or a control signal to a base station (gNode B, eNode B, or base station (BS)), and downlink refers to a radio link via which a base station transmits data or a control signal to a terminal. In such a multiple access scheme, in general, data or control information of each user may be distinguished by assigning and operating time-frequency resources, at which data or control information of each user is transmitted, so as not to overlap each other, that is, to establish orthogonality.

The 5G or NR system adopts a hybrid automatic repeat request (HARQ) scheme in which corresponding data is retransmitted in a physical layer when a decoding failure occurs in initial transmission. In the HARQ scheme, when a receiver fails to correctly decode the data, the receiver transmits negative acknowledgement (NACK) informing a transmitter of the decoding failure so as to enable the transmitter to retransmit the data in a physical layer. The receiver improves data reception performance, by combining the data retransmitted by the transmitter with the data, decoding of which has previously failed. Further, when the receiver correctly decodes the data, the receiver may transmit information (acknowledgment: ACK) indicating a success of decoding to the transmitter so as to allow the transmitter to transmit new data.

The new radio (NR) access technology system, i.e., 5G communication, is designed so that various services are freely multiplexed in time and frequency resources, and accordingly, a waveform/numerology, a reference signal, and the like, may be assigned dynamically or freely according to the needs of corresponding services. In order to provide an optimal service to a terminal in wireless communication, optimized data transmission via measurement of an interference amount and a channel quality is important, and therefore accurate channel state measurement is essential. However, unlike 4G communication, in which channel and interference characteristics do not change significantly according to frequency resources, in the case of 5G or NR channels, because channel and interference characteristics vary significantly depending on services, it is necessary to support a subset of a frequency resource group (FRG) level, which enables measurement by division.

In the 5G or NR system, types of supported services may be divided into categories, such as enhanced mobile broadband (eMBB), massive machine type communications (mMTC), and ultra-reliable and low-latency communications (URLLC). The eMBB is a service aimed at high speed transmission of high capacity data, the mMTC is a service aimed at minimizing a terminal power and accessing multiple terminals, and the URLLC is a service aimed at high reliability and low latency. Different requirements may be applied depending on types of services applied to the terminal.

Among the above-mentioned services, because a URLLC service aims at high reliability and low latency, there may be a need to transmit control information and data information, which may be transmitted on a physical channel at a low coding rate. In narrow band Internet-of-things (NB-IoT) or MTC services of LTE, repeated transmission of control information has been introduced. The purpose of the introduction is to provide high coverage for a terminal having a small bandwidth, and a delay time is not sufficiently considered. A minimum unit of repetitive transmission of the control information is fixed in units of subframes based on LTE.

In order to support the URLLC service in the NR or 5G system, it is necessary to adopt a control information repetitive transmission mode that may improve reliability while requiring less latency time. Therefore, the disclosure considers a situation in which control information is repeatedly transmitted in a slot. In addition, the disclosure considers a situation in which control information transmittable across a slot boundary is repeatedly transmitted. Via the method provided in the disclosure, it is possible for a terminal to detect control information transmitted from a base station with higher reliability at a faster time.

In the disclosure, terms are defined based on respective functions, and may vary depending on intention or usage of users or operators. Therefore, the definition should be based on the contents throughout the specification. Hereinafter, a base station is a subject that performs resource allocation to a terminal, and may be at least one of a gNode B (gNB), an eNode B (eNB), a node B, a base station (BS), a radio access unit, a base station controller, or a node on a network. A terminal may include a UE, an MS, a cellular phone, a smart phone, a computer, or a multimedia system capable of performing a communication function. In the disclosure, downlink (DL) is a radio transmission path of a signal transmitted from a base station to a terminal, and uplink (UL) refers to a radio transmission path of a signal transmitted from a terminal to a base station. Hereinafter, in the disclosure, an NR system is described as an example, but the disclosure is not limited thereto. Embodiments may be applied to various communication systems having similar technical backgrounds or channel forms. Further, the disclosure may be applied to other communication systems via some modifications without departing from the scope of the disclosure, according to determination by those skilled in the art.

In the disclosure, terms of physical channel and signal of the related art may be used interchangeably with data or a control signal. For example, although a physical downlink shared channel (PDSCH) is a physical channel through which data is transmitted, the PDSCH may be referred to as data in the disclosure.

In the disclosure, higher signaling is a signal transmission method, in which a signal is transmitted from a base station to a terminal by using a downlink data channel of a physical layer or a signal is transmitted from a terminal to a base station by using an uplink data channel of a physical layer, wherein the higher signaling may be referred to as radio resource control (RRC) signaling or medium access control (MAC) control element (CE, hereinafter control element).

Recently, as research on a next-generation communication system is progressing, various methods for scheduling communication with a terminal are being discussed. Accordingly, efficient scheduling and data transmission/reception methods based on characteristics of the next-generation communication system are required. Accordingly, in order to provide a plurality of services to a user in a communication system, a method capable of providing a user with each service according to characteristics of the service within the same time interval, and a device using the method are required.

A terminal should receive separate control information from a base station in order to transmit data to or receive data from a base station. However, in the case of a service type requiring periodic traffic or low latency/high reliability, it may be possible to transmit or receive data without the separate control information. In the disclosure, such a transmission scheme is referred to as a configured grant or grant-free based data transmission method. A method of receiving or transmitting data after receiving a data transmission resource configuration, which is configured via control information, and related information may be referred to as a first signal transmission/reception type, and a method of transmitting or receiving data based on previously configured information without control information may be referred to as a second signal transmission/reception type.

A resource region preconfigured for data transmission/reception of the second signal transmission/reception type may periodically exist. The region may be preconfigured via a UL type 1 grant that is a method configured via only a higher signal and a UL type 2 grant (or SPS) that is a method configured by a combination of a higher signal and signal L1 (e.g., downlink control information (DCI)). In the case of the UL type 2 grant (or SPS), a part of information is determined via the higher signal, and whether to perform actual data transmission is determined based on signal L1. Here, signal L1 may be broadly classified into a signal indicating to enable a resource, which is configured as a higher level, and a signal indicating release of the enabled resource again. The disclosure provides a method of, if one or more resources configured as a higher level exist, enabling or releasing the resources via signal L1. In the disclosure, a resource to be used may be indicated via signal L1 from among sets of resources configured via the higher signal.

FIG. 1 is a diagram illustrating a transmission structure in a time-frequency domain, that is, a radio resource region of a 5G or NR system according to an embodiment of the disclosure.

Referring to FIG. 1, a horizontal axis represents a time domain and a vertical axis represents a frequency domain in a radio resource region. A minimum transmission unit in the time domain is an OFDM symbol, and the $N_{symb}$ number of OFDM symbols 102 constitute one slot 106. A length of a subframe may be defined as 1.0 ms and a radio frame 114 may be defined as 10 ms. A minimum transmission unit in the frequency domain is a subcarrier, and a bandwidth of the entire system transmission bandwidth may include a total of the NBW number of subcarriers 104. Such a specific value may be applied variably depending on the system.

A basic unit of a time-frequency resource region is a resource element (RE) 112 and may be represented by an OFDM symbol index and a subcarrier index. A resource block (RB) 108 may be defined as the NRB number of consecutive subcarriers 110 in the frequency domain.

In general, a minimum transmission unit of data is an RB unit. In a 5G or NR system, in general, $N_{symb}$=14, $N_{RB}$=12, and $N_{BW}$ may be proportional to a bandwidth of a system transmission band. A data rate increases in proportion to the number of RBs scheduled to a terminal. In the 5G or NR system, a downlink transmission bandwidth and an uplink transmission bandwidth may be different in the case of a frequency division duplex (FDD) system that operates by dividing a downlink and an uplink by frequency. A channel bandwidth represents an RF bandwidth corresponding to a system transmission bandwidth. Table 1 below shows a corresponding relationship between a channel bandwidth and the system transmission bandwidth defined in an LTE system that is 4$^{th}$ generation wireless communication, before the 5G or NR system. For example, in an LTE system having a channel bandwidth of 10 MHz, a transmission bandwidth includes 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

In the 5G or NR system, a channel bandwidth wider than the channel bandwidth of LTE shown in Table 1 may be used. Table 2 shows a corresponding relationship between a system transmission bandwidth, a channel bandwidth, and a subcarrier spacing (SCS) in the 5G or NR system.

TABLE 2

| SCS [kHz] | Channel bandwidth $BW_{Channel}$ [MHz] | | | | | | | | | |
|---|---|---|---|---|---|---|---|---|---|---|
| | 5 | 10 | 15 | 20 | 25 | 40 | 50 | 60 | 80 | 100 |
| Maximum Transmission bandwidth $N_{RB}$ 15 | 25 | 52 | 79 | 106 | 133 | 216 | 270 | N.A. | N.A. | N.A. |
| 30 | 11 | 24 | 38 | 51 | 65 | 106 | 133 | 162 | 217 | 273 |
| 60 | N.A. | 11 | 18 | 24 | 31 | 51 | 65 | 79 | 107 | 135 |

Scheduling information on downlink data or uplink data in the 5G or NR system is transferred from a base station to a terminal based on downlink control information (DCI). DCI is defined according to various formats, and the DCI may represent, according to each format, whether scheduling information is for uplink data (UL grant) or scheduling information is for downlink data (DL grant), whether the DCI is compact DCI having a small size of control information, whether spatial multiplexing using multiple antennas is applied, whether the DCI is for controlling power, and the like. For example, DCI format 1_1, which is scheduling control information (DL grant) for downlink data, may include at least one piece of following control information.

Carrier indicator: Indicating at which frequency carrier transmission is performed DCI format indicator: An indicator that identifies whether corresponding DCI is for downlink or uplink Bandwidth part (BWP) indicator: Indicating in which BWP downlink data is transmitted Frequency domain resource allocation: Indicating an RB of a frequency domain allocated for data transmission. A resource to be represented is determined according to a system bandwidth and a resource allocation scheme.

Time domain resource allocation: Indicating in which OFDM symbol of which slot a data-related channel is to be transmitted VRB-to-PRB mapping: Indicating by which scheme a virtual RB (hereinafter, VRB) index and a physical RB (hereinafter, PRB) index are to be mapped Modulation and coding scheme (MCS): Indicating a coding rate and a modulation scheme used for data transmission. For example, a coding rate value may be indicated, wherein the coding rate value enables informing of a transport block size (TBS) and channel coding information, in addition to information indicating whether a modulation scheme is quadrature phase shift keying (QPSK), quadrature amplitude modulation (16QAM), 64QAM, or 256QAM.

Codeblock group (CBG) transmission information: When retransmission of a CBG is configured, indicating information on which CBG is transmitted HARQ process number: Indicating a process number of HARQ New data indicator: Indicating whether transmission is HARQ initial transmission or retransmission Redundancy version: Indicating a redundancy version of HARQ Physical uplink control channel (PUCCH) resource indicator: Indicating a PUCCH resource for transmission of ACK/NACK information for downlink data PDSCH-to-HARQ_feedback timing indicator: Indicating a slot in which ACK/NACK information for downlink data is transmitted Transmission power control (TPC) command for PUCCH: Indicating a transmission power control command for PUCCH, i.e., an uplink control channel Time domain resource allocation of physical uplink share channel (PUSCH) transmission may be indicated by information relating to a slot in which the PUSCH is transmitted, and a starting OFDM symbol position S at the slot, and the number L of OFDM symbols to which the PUSCH is mapped. The above-described S may be a relative position from starting of the slot, L may be the number of consecutive OFDM symbols, and S and L may be determined based on a start and length indicator value (SLIV) defined as follows.

If $(L-1) \leq 7$ then
    $SLIV = 14 \cdot (L-1) + S$
else
    $SLIV = 14 \cdot (14-L+1) + (14-1-S)$
where $0 < L \leq 14-S$ In the 5G or NR system, in general, a table including, in one row, information on a slot in which a PUSCH is transmitted, a PUSCH mapping type, and an SLIV value may be configured via an RRC configuration. Subsequently, in time domain resource allocation of DCI, the base station may transfer information on the slot in which the PUSCH is transmitted, the PUSCH mapping type, and the SLIV value to the terminal by indicating an index value in the configured table. Such a method may also be applied to a PDSCH.

Specifically, if the base station transmits, to the terminal, time resource allocation field index m included in DCI for scheduling of the PDSCH, the transmission indicates a combination of DRMS type A position information, PDSCH mapping type information, slot index KO, data resource start symbol S, and data resource allocation length L, which correspond to m+1 in the table showing time domain resource allocation information. For example, Table 3 below is a table including PDSCH time domain resource allocation information based on a normal cyclic prefix.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |

TABLE 3-continued

| Row index | dmrs-TypeA-Position | PDSCH mapping type | K₀ | S | L |
|---|---|---|---|---|---|
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, dinrs-typeA-Position is a field indicating a symbol position at which a demodulation reference signal (DMRS) is transmitted within one slot indicated by a system information block (SIB) that is a piece of terminal common control information. A possible value for the field is 2 or 3. When a total number of symbols constituting one slot is 14 and a first symbol index is 0, 2 refers to a third symbol and 3 refers to a 4th symbol.

In Table 3, the PDSCH mapping type is information indicating a position of a DMRS in a scheduled data resource region. If the PDSCH mapping type is A, a DMRS is always transmitted or received at a symbol position determined by dmrs-typeA-Position regardless of the allocated data time domain resource: If the PDSCH mapping type is B, a position of the DMRS for transmission/reception is always a first symbol of the allocated data time domain resource. In other words, PDSCH mapping type B does not use dmrs-typeA-Position information.

In Table 3, $K_0$ refers to an offset of a slot index to which a physical downlink control channel (PDCCH), on which a DCI is transmitted, belongs and a slot index, to which a PUSCH or PDSCH scheduled based on the DCI belongs. For example, if a slot index of the PDCCH is n, a slot index of the PUSCH or PDSCH scheduled based on DCI of the PDCCH is n+$K_0$. In Table 3, S refers to a start symbol index of a data time domain resource within one slot. The range of a possible S value is 0 to 13 based on the normal cyclic prefix. In Table 3, L refers to a data time domain resource interval length within one slot. The range of a possible L value is 1 to 14.

In the 5G or NR systems, PUSCH mapping types are defined by type A and type B. In PUSCH mapping type A, a first OFDM symbol of DMRS OFDM symbols is located in a second or third OFDM symbol of the slot. In PUSCH mapping type B, the first OFDM symbol of DMRS OFDM symbols is located in a first OFDM symbol in a time domain resource allocated for PUSCH transmission. The above-described method for PUSCH time domain resource allocation may be equally applicable to PDSCH time domain resource allocation.

DCI may be transmitted on a physical downlink control channel (PDCCH) (or control information, hereinafter, PDCCH and control information may be interchangeably used) which is a downlink physical control channel via channel coding and modulation. In general, DCI is independently scrambled with a specific radio network temporary identifier (RNTI) (or a terminal identifier) for each terminal so as to have a cyclic redundancy check (CRC) added thereto, is channel-coded, and then is configured to each independent PDCCH so as to be transmitted. The PDCCH is mapped to a control resource set (CORESET) configured for the terminal and is transmitted.

Downlink data may be transmitted on a physical downlink shared channel (PDSCH) that is a physical channel for downlink data transmission. The PDSCH may be transmitted after a control channel transmission interval, and scheduling information, such as a specific mapping position, a modulation scheme, and the like, in the frequency domain, is determined based on DCI transmitted via the PDCCH.

Via MCS in control information constituting the DCI, the base station notifies the terminal of a modulation scheme applied to the PDSCH to be transmitted and the size of data to be transmitted (transport block size, TBS). In an embodiment of the disclosure, the MCS may include 5 bits or may include more or fewer than 5 bits. The TBS corresponds to a size of a transport block (TB) before channel coding for error correction is applied to a data TB to be transmitted by the base station.

In the disclosure, a transport block (TB) may include a medium access control (MAC) header, a MAC CE, one or more MAC service data units (SDUs), and padding bits. Alternatively, the TB may represent a MAC protocol data unit (PDU) or a data unit for transformation from a MAC layer to a physical layer.

Modulation schemes supported by the 5G or NR system are quadrature phase shift keying (QPSK), 16 quadrature amplitude modulation (QAM), 64QAM, and 256QAM, which correspond to modulation orders $Q_m$ of 2, 4, 6, and 8, respectively. For example, 2 bits per symbol may be transmitted in the case of QPSK modulation, 4 bits per OFDM symbol may be transmitted in the case of 16QAM modulation, 6 bits per symbol may be transmitted in the case of 64QAM modulation, and 8 bits per symbol may be transmitted in the case of 256QAM modulation.

Figure 2:
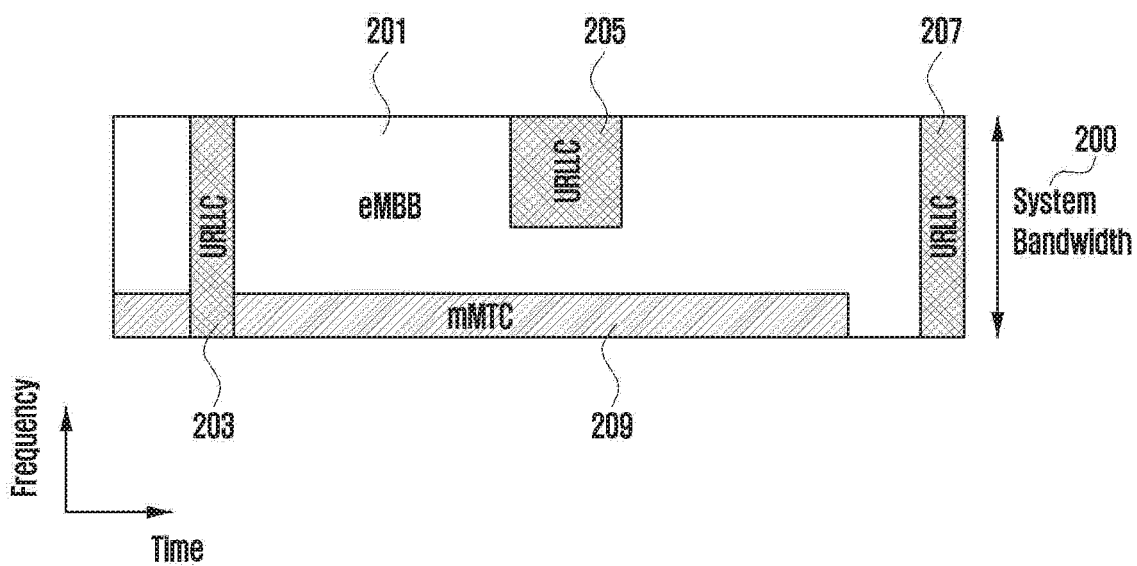
FIG. 2 is a diagram illustrating a method for assigning data for enhanced mobile broadband (eMBB), ultra-reliable and low-latency communications (URLLC), and massive machine type communications (mMTC) in a time-frequency resource region in the 5G or NR system according to an embodiment of the disclosure.

FIG. 2 is a diagram illustrating a method for assigning data for eMBB, URLLC, and mMTC in a time-frequency resource region in the 5G or NR system according to an embodiment of the disclosure.

Referring to FIG. 2, data for eMBB, URLLC, and mMTC may be assigned in the entire system frequency band 200. If URLLC data 203, 205, and 207 are generated and need to be transmitted while eMBB data 201 and mMTC data 209 are being assigned and transmitted in a specific frequency band, a transmitter may empty parts where the eMBB data 201 and the mMTC data 209 have already been assigned, or may transmit the URLLC data 203, 205, and 207 without transmitting the eMBB data 201 and the mMTC data 209. Among the above-mentioned services, the URLLC needs to reduce a latency time, and therefore the URLLC data may be assigned to a part of a resource, to which the eMBB data or the mMTC data has been assigned, so as to be transmitted. If the URLLC data is further assigned to and transmitted in the resource to which the eMBB data has been assigned, the eMBB data may not be transmitted in an overlapping time-frequency resource, and therefore transmission performance of the eMBB data may be reduced. For example, an eMBB data transmission failure due to URLLC allocation may occur.

Figure 3:
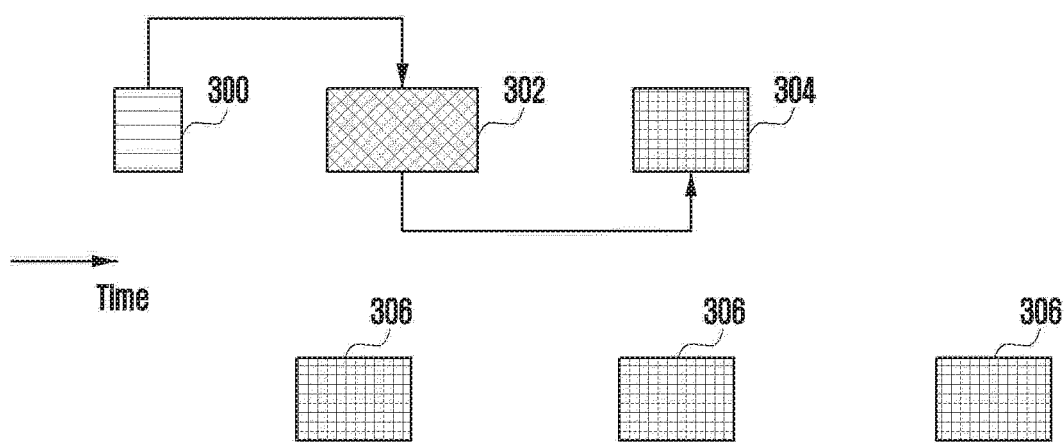
FIG. 3 is a diagram illustrating a physical uplink control channel (PUCCH) transmission method according to an embodiment of the disclosure.

FIG. 3 is a diagram illustrating a PUCCH transmission method according to an embodiment according to an embodiment of the disclosure.

In the 5G or NR system, a terminal transmits control information to a base station via a physical uplink control channel (PUCCH). The control information transmitted via the PUCCH may include at least one of HARQ-ACK, CSI, and scheduling request (SR) information.

HARQ-ACK information is for transmission of a demodulation/decoding result for a TB received from the base station by the terminal via a physical downlink share channel (PDSCH). The HARQ-ACK information is a value for success or failure and is reported to the base station.

CSI is information obtained by channel estimation based on a CSI-RS received from the base station by the terminal.

An SR is information for requesting a resource for a physical uplink share channel (PUSCH) if there exists data to be transmitted to the base station by the terminal.

Referring to FIG. 3, a procedure of transmitting HARQ-ACK information via a PUCCH by a terminal is illustrated.

In FIG. 3, a terminal receives DCI via a PDCCH 300, and the terminal is scheduled for PDSCH 302 and PUCCH 304 resources via the DCI. Specifically, the terminal may partially configure a range of information that may be indicated in the DCI via a higher signal. For the DCI, one piece of information may be selected in information configured via the higher signal. In the disclosure, DCI may be used in place of signal L1. A higher signal may collectively refer to all signals above L1.

Alternatively, a periodic PUCCH resource 306 may be always configured as a higher signal without reception of DCI. A corresponding PUCCH resource may be used for transmitting SR information.

A method of transmitting the PUCCH is shown in Table 4 below.

TABLE 4

| 9.2 UCI reporting on physical uplink control channel |
|---|
| A UCI type reported in a PUCCH includes HARQ-ACK information, an SR, and CSI. UCI bits include an HARQ-ACK information bit (if any), an SR information bit (if any), and a CSI bit (if any). The HARQ-ACK information bit corresponds to an HARQ-ACK codebook, as described in subclause 9.1. As defined in [4, TS 38.211], a UE may transmit one or two PUCCHs on a serving cell in different symbols within a slot of symbol $N_{symb}^{slot}$. When the UE transmits two PUCCHs in a slot, at least one of the two PUCCHs uses PUCCH format 0 or PUCCH format 2. In order to determine the number of PRBs in subclauses 9.2.3, 9.2.5.1 and 9.2.5.2, the UE assumes 11 CRC bits if the number of respective UCI bits is greater than or equal to 360; otherwise, the UE determines the number of CRC bits based on the number of respective UCI bits, as described in [5, TS 38.212]. |
| 9.2.1 PUCCH Resource Sets |
| If a UE does not have dedicated PUCCH resource configuration, provided by PUCCH-ResourceSet in PUCCH-Config, a PUCCH resource set is provided by pucch-ResourceCommon through an index to a row of TABLE 9.2.1-1 for transmission of HARQ-ACK information on PUCCH in an initial UL BWP of $N_{BWP}^{size}$ PRBs. The PUCCH resource set includes sixteen resources, each corresponding to a PUCCH format, a first symbol, a duration, a PRB offset $RB_{BWP}^{offset}$, and a cyclic shift index set for a PUCCH transmission. The UE transmits a PUCCH using frequency hopping. An orthogonal cover code with index 0 is used for a PUCCH resource with PUCCH format 1 in TABLE 9.2.1-1. The UE transmits the PUCCH using the same spatial domain transmission filter as for a PUSCH transmission scheduled by a RAR UL grant as described in Subclause 8.3. The UE does not expect to generate more than one HARQ-ACK information bit prior to establishing RRC connection as described in [12, TS 38.331]. If the UE provides HARQ-ACK information in a PUCCH transmission in response to detecting a DCI format 1_0 or DCI format 1_1, the UE determines a PUCCH resource with index $r_{PUCCH}$, $0 \leq r_{PUCCH} \leq 15$, as $r_{PUCCH} = \left\lfloor \frac{2 \cdot n_{CCE,0}}{N_{CCE}} \right\rfloor + 2 \cdot \Delta_{PRI}$, where $N_{CCE}$ is a number of CCEs in a CORESET of a PDCCH reception with DCI format 1_0 or DCI format 1_1, as described in Subclause 10.1, $n_{CCE,0}$ is the index of a first CCE for the PDCCH reception, and $\Delta_{PRI}$ is a value of the PUCCH resource indicator field in the DCI format 1_0 or DCI format 1_1. If $\lfloor r_{PUCCH}/8 \rfloor = 0$ the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{size} - 1 - RB_{BWP}^{offset} - \lfloor r_{PUCCH}/N_{CS} \rfloor$, where $N_{CS}$ is the total number of initial cyclic shift indexes in the set of initial cyclic shift indexes the UE determines the initial cyclic shift index in the set of initial cyclic shift indexes as $r_{PUCCH} \bmod N_{CS}$ If $\lfloor r_{PUCCH}/8 \rfloor = 1$ the UE determines the PRB index of the PUCCH transmission in the first hop as $N_{BWP}^{size} - 1 - RB_{BWP}^{offset} - \lfloor (r_{PUCCH} - 8)/N_{CS} \rfloor$ and the PRB index of the PUCCH transmission in the second hop as $RB_{BWP}^{offset} + \lfloor (r_{PUCCH} - 8)/N_{CS} \rfloor$ |

TABLE 4-continued the UE determines the initial cyclic shift index in the set of initial cyclic shift indexes as $(r_{PUCCH} - 9) \bmod N_{CS}$ Table 9.2.1-1: PUCCH resource sets before dedicated PUCCH resource configuration

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

If a UE has dedicated PUCCH resource configuration, the UE is provided by higher layers with one or more PUCCH resources.
A PUCCH resource includes the following parameters:
a PUCCH resource index provided by pucch-ResourceId
an index of the first PRB prior to frequency hopping or for no frequency hopping by startingPRB
an index of the first PRB after frequency hopping by secondHopPRB;
an indication for intra-slot frequency hopping by intraSlotFreqnencyHopping
a configuration for a PUCCH format, from PUCCH format 0 through PUCCH format 4, provided by format
If the format indicates PUCCH-format0, the PUCCH format configured for a PUCCH resource is PUCCH format 0, where the PUCCH resource also includes an index for an initial cyclic shift provided by initialCyclicShift, a number of symbols for a PUCCH transmission provided by nrofSymbols, a first symbol for the PUCCH transmission provided by startingSymbolIndex.
If the format indicates PUCCH-format1, the PUCCH format configured for a PUCCH resource is PUCCH format 1, where the PUCCH resource also includes an index for an initial cyclic shift provided by initialCyclicShift, a number of symbols for a PUCCH transmission provided by nrofSymbols, a first symbol for the PUCCH transmission provided by startingSymbolIndex, and an index for an orthogonal cover code by timeDomainOCC.
If the format indicates PUCCH-format2 or PUCCH-format3, the PUCCH format configured for a PUCCH resource is PUCCH format 2 or PUCCH format 3, respectively, where the PUCCH resource also includes a number of PRBs provided by nrofPRBs, a number of symbols for a PUCCH transmission provided by nrofSymbols, and a first symbol for the PUCCH transmission provided by startingSymbolIndex.
If the format indicates PUCCH-format4, the PUCCH format configured for a PUCCH resource is PUCCH format 4, where the PUCCH resource also includes a number of symbols for a PUCCH transmission provided by nrofSymbols, a length for an orthogonal cover code by occ-Length, an index for an orthogonal cover code by occ-Index, and a first symbol for the PUCCH transmission provided by startingSymbolIndex.
A UE can be configured up to four sets of PUCCH resources. A PUCCH resource set is provided by PUCCH-ResourceSet and is associated with a PUCCH resource set index provided by pucch-ResourceSetId, with a set of PUCCH resource indexes provided by resourceList that provides a set of pucch-ResourceId used in the PUCCH resource set, and with a maximum number of UCI information bits the UE can transmit using a PUCCH resource in the PUCCH resource set provided by maxPayloadMinus1. For the first PUCCH resource set, the maximum number of UCI information bits is 2. A maximum number of PUCCH resource indexes for a set of PUCCH resources is provided by maxNrofPUCCH-ResourcesPerSet. The maximum number of PUCCH resources in the first PUCCH resource set is 32 and the maximum number of PUCCH resources in the other PUCCH resource sets is 8.
If the UE transmits $o_{UCI}$ UCI information bits, that include HARQ-ACK information bits, the UE determines a PUCCH resource set to be
a first set of PUCCH resources with pucch-ResourceSetId = 0 if $O_{UCI} \leq 2$ including 1 or 2 HARQ-ACK information bits and a positive or negative SR on one SR transmission occasion if transmission of HARQ-ACK information and SR occurs simultaneously, or
a second set of PUCCH resources with pucch-ResourceSetId = 1, if provided by higher layers, if $2 < O_{UCI} \leq N_2$ where $N_2$ is equal to maxPayloadMinus1 if maxPayloadMinus1 is provided for the PUCCH resource set with pucch-ResourceSetId = 1; otherwise $N_2$ is equal to 1706, or TABLE 4-continued a third set of PUCCH resources with pucch-ResourceSetId = 2, if provided by
higher layers, if $N_2 < O_{UCI} \leq N_3$ where $N_3$ is equal to maxPayloadMinus1 if
maxPayloadMinus1 is provided for the PUCCH resource set with pucch-
ResourceSetId = 2; otherwise $N_3$ is equal to 1706, or
a fourth set of PUCCH resources with pucch-ResourceSetId = 3, if provided by
higher layers, if $N_3 < O_{UCI} \leq 1706$.

9.2.2 PUCCH Formats for UCI transmission

If a UE is not transmitting PUSCH, and the UE is transmitting UCI, the UE transmits
UCI in a PUCCH using
    PUCCH format 0 if
        the transmission is over 1 symbol or 2 symbols,
        the number of HARQ-ACK information bits with positive or
        negative SR (HARQ-ACK/SR bits) is 1 or 2
    PUCCH format 1 if
        the transmission is over 4 or more symbols,
        the number of HARQ-ACK/SR bits is 1 or 2
    PUCCH format 2 if
        the transmission is over 1 symbol or 2 symbols,
        the number of UCI bits is more than 2
    PUCCH format 3 if
        the transmission is over 4 or more symbols,
        the number of UCI bits is more than 2,
        the PUCCH resource does not include an orthogonal cover code
    PUCCH format 4 if
        the transmission is over 4 or more symbols,
        the number of UCI bits is more than 2,
        the PUCCH resource includes an orthogonal cover code
A spatial setting for a PUCCH transmission is provided by PUCCH-SpatialRelationInfo
if the UE is configured with a single value for pucch-SpatialRelationInfoId, otherwise, if
the UE is provided multiple values for PUCCH-SpatialRelationInfo, the UE determines
a spatial setting for the PUCCH transmission as described in [11, TS 38.321]. The UE
applies corresponding actions in [11, TS 38.321] and a corresponding setting for a
spatial domain filter to transmit PUCCH 3 msec after the slot where the UE transmits
HARQ-ACK information with ACK value corresponding to a PDSCH reception
providing the PUCCH-SpatialRelationInfo
If PUCCH-SpatialRelationInfo provides ssb-Index, the UE transmits the PUCCH
using a same spatial domain filter as for a reception of a SS/PBCH block with
index provided by ssb-Index for a same serving cell or, if servingCellId is
provided, for a serving cell indicated by servingCellId
else if PUCCH-SpatialRelationInfo provides csi-RS-Index, the UE transmits the
PUCCH using a same spatial domain filter as for a reception of a CSI-RS with
resource index provided by csi-RS-Index for a same serving cell or, if
servingCellId is provided, for a serving cell indicated by servingCellId
else PUCCH-SpatialRelationInfo provides srs, the UE transmits the PUCCH using
a same spatial domain filter as for a transmission of a SRS with resource index
provided by resource for a same serving cell and/or active UL BWP or, if
servingCellId and/or uplinkBWP are provided, for a serving cell indicated by
servingCellId and/or for an UL BWP indicated by uplinkBWP
A number of DMRS symbols for a PUCCH transmission using PUCCH format 3 or 4 is
provided by additionalDMRS.
Use of p/2-PBSK, instead of QPSK, for a PUCCH transmission using PUCCH format 3
or 4 is indicated by pi2BPSK.

9.2.3 UE procedure for reporting HARQ-ACK

A UE does not expect to transmit more than one PUCCH with HARQ-ACK information
in a slot.
For DCI format 1_0, the PDSCH-to-HARQ-timing-indicator field values map to {1, 2,
3, 4, 5, 6, 7, 8). For DCI format 1_1, if present, the PDSCH-to-HARQ-timing-indicator
field values map to values for a set of number of slots provided by dl-DataToUL-ACK as
defined in TABLE 9.2.3-1.
For a SPS PDSCH reception ending in slot $_n$, the UE transmits the PUCCH in slot n + k
where k is provided by the PDSCH-to-HARQ-timing-indicator field in DCI format
1_0 or, if present, in DCI format 1_1 activating the SPS PDSCH reception.
If the UE detects a DCI format 1_1 that does not include a PDSCH-to-HARQ-timing-
indicator field and schedules a PDSCH reception or activates a SPS PDSCH reception
ending in slot $_n$, the UE provides corresponding HARQ-ACK information in a PUCCH
transmission within slot n + k where k is provided by dl-DataToUL-ACK.
With reference to slots for PUCCH transmissions, if the UE detects a DCI format 1_0 or
a DCI format 1_1 scheduling a PDSCH reception ending in slot $_n$ or if the UE detects a
DCI format 1_0 indicating a SPS PDSCH release through a PDCCH reception ending in
slot $_n$, the UE provides corresponding HARQ-ACK information in a PUCCH
transmission within slot n + k, where k is a number of slots and is indicated by the
PDSCH-to-HARQ-timing-indicator field in the DCI format, if present, or provided by
dl-DataToUL-ACK. k = 0 corresponds to the last slot of the PUCCH transmission that
overlaps with the PDSCH reception or with the PDCCH reception in case of SPS
PDSCH release.

TABLE 4-continued

A PUCCH transmission with HARQ-ACK information is subject to the limitations for
UE transmissions described in Subclause 11.1 and Subclause 11.1.1.

Table 9.2.3-1: Mapping of PDSCH-to-HARQ_feedback timing indicator field values to numbers of slots

| PDSCH-to-HARQ_feedback timing indicator | | | |
| --- | --- | --- | --- |
| 1 bit | 2 bits | 3 bits | Number of slots k |
| '0' | '00' | '000' | $1^{st}$ value provided by dl-DataTo-ACK |
| '1' | '01' | '001' | $2^{nd}$ value provided by dl-DataToUL-ACK |
|  | '10' | '010' | $3^{rd}$ value provided by dl-DataTo-ACK |
|  | '11' | '011' | $4^{th}$ value provided by dl-DataTo-ACK |
|  |  | '100' | $5^{th}$ value provided by dl-dataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

For a PUCCH transmission with HARQ-ACK information, a UE determines a PUCCH resource after determining a set of PUCCH resources for $o_{UCI}$ HARQ-ACK information bits, as described in Subclause 9.2.1. The PUCCH resource determination is based on a PUCCH resource indicator field [5, TS 38.212] in a last DCI format 1_0 or DCI format 1_1, among the DCI formats 1_0 or DCI formats 1_1 that have a value of a PDSCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are first indexed in an ascending order across serving cells indexes for a same PDCCH monitoring occasion and are then indexed in an ascending order across PDCCH monitoring occasion indexes.
The PUCCH resource indicator field values map to values of a set of PUCCH resource indexes, as defined in TABLE 9.2.3-2, provided by ResourceList for PUCCH resources from a set of PUCCH resources provided by PUCCH-ResourceSet with a maximum of eight PUCCH resources.
For the first set of PUCCH resources and when the size $R_{PUCCI}$ of resourceList is larger than eight, when a UE provides HARQ-ACK information in a PUCCH transmission in response to detecting a last DCI format 1_0 or DCI format 1_1 in a PDCCH reception, among DCI formats 1_0 or DCI formats 1_1 with a value of the PDSCH-to-HARQ_feedback timing indicator field indicating a same slot for the PUCCH transmission, the UE determines a PUCCH resource with index $r_{PUCCH}$
$0 \le r_{PUCCH} \le R_{PUCCH} - 1$, as $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \ge R_{PUCCH} \bmod 8 \end{cases}$$

where $N_{CCE,p}$ is a number of CCEs in CORESET p of the PDCCH reception for the DCI format 1_0 or DCI format 1_1 as described in Subclause 10.1, $n_{CCE,p}$ is the index of a first CCE for the PDCCH reception, and $\Delta_{PRI}$ is a value of the PUCCH resource indicator field in the DCI format 1_0 or DCI format 1_1.

Table 9.2.3-2: Mapping of PUCCH resource indication field values to a PUCCH resource in a PUCCH resource set with maximum 8 PUCCH resources

| PUCCH resource indicator | PUCCH resource |
| --- | --- |
| '000' | $1^{st}$ PUCCH resource provided by pucch-ResourceId obtained from the $1^{st}$ value of resourceList |
| '001' | $2^{nd}$ PUCCH resource provided by pucch-ResourceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |
| '110' | $7^{th}$ PUCCH resource provided by pucch-ResourceId obtained from the $7^{th}$ value of resourceList |

TABLE 4-continued

| | |
|---|---|
| '111' | $8^{th}$ PUCCH resource provided by pucch-ResourceId obtained from the $8^{th}$ value of resourceList |

If a UE detects a first DCI format 1_0 or DCI format 1_1 indicating a first resource for a
PUCCH transmission with corresponding HARQ-ACK information in a slot and also
detects at a later time a second DCI format 1_0 or DCI format 1_1 indicating a second
resource for a PUCCH transmission with corresponding HARQ-ACK information in the
slot, the UE does not expect to multiplex HARQ-ACK information corresponding to the
second DCI format in a PUCCH resource in the slot if the PDCCH reception that
includes the second DCI format is not earlier than $N_3$ symbols from a first symbol of the
first resource for PUCCH transmission in the slot where, for UE processing capability 1
and SCS configuration $\mu$, $N_3 = 8$, for $\mu = 0$, $N_3 = 10$, for $\mu = 1$, $N_3 = 17$, for $\mu = 2$,
$N_3 = 20$ for $\mu = 3$, and for UE processing capability 2 and SCS configuration $\mu$, $N_3 = 3$
for $\mu = 0$, $N_3 = 4.5$ for $\mu = 1$, $N_3 = 9$ for $\mu = 2$ .
If a UE transmits HARQ-ACK information corresponding only to a PDSCH reception
without a corresponding PDCCH, a PUCCH resource for corresponding PUCCH
transmission with HARQ-ACK information is provided by n1PUCCH-AN.
If a UE transmits a PUCCH with HARQ-ACK information using PUCCH format 0, the
UE determines values $m_0$ and $m_{CS}$ for computing a value of cyclic shift $\alpha$ [4, TS
38.211] where $m_0$ is provided by initialCyclicShift of PUCCH-format0 or, if
initialCyclicShift is not provided, by the initial cyclic shift index as described in
Subclause 9.2.1 and $m_{CS}$ is determined from the value of one HARQ-ACK information
bit or from the values of two HARQ-ACK information bits as in TABLE 9.2.3-3 and TABLE
9.2.3-4, respectively.

TABLE 9.2.3-3: Mapping of values for one HARQ-ACK information bit to sequences for PUCCH format 0

| HARQ-ACK Value | 0 | 1 |
|---|---|---|
| Sequence cyclic shift | $m_{CS} = 0$ | $m_{CS} = 6$ |

TABLE 9.2.3-4: Mapping of values for two HARQ-ACK information bits to sequences for PUCCH format 0

| HARQ-ACK Value | {0, 0} | {0, 1} | {1, 1} | {1, 0} |
|---|---|---|---|---|
| Sequence cyclic shift | $m_{CS} = 0$ | $m_{CS} = 3$ | $m_{CS} = 6$ | $m_{CS} = 9$ |

If a UE transmits a PUCCH with HARQ-ACK information using PUCCH format 1, the
UE is provided a value for $m_0$ by initialCyclicShift of PUCCH-format1.
If a UE transmits a PUCCH with $o_{ACK}$ HARQ-ACK information bits and $o_{CRC}$ bits using
PUCCH format 2 or PUCCH format 3 in a PUCCH resource that includes $M_{RB}^{PUCCH}$
PRBs, the UE determines a number of PRBs $M_{RBmin}^{PUCCH}$ for the PUCCH transmission to be
the minimum number of PRBs, that is smaller than or equal to a number of PRBs
$M_{RB}^{PUCCH}$ provided respectively by nrofPRBs of PUCCH-format2 or nrofPRBs of
PUCCH-format3 and start from the first PRB from the number of PRBs, that results to $(O_{ACK} + O_{CRC}) \leq M_{RB,min}^{PUCCH} \cdot N_{sc,ctrl}^{RB} \cdot N_{symbUCI}^{PUCCH} \cdot Q_m \cdot r$ and, if $M_{RB}^{PUCCH} > 1$, $(O_{ACK} + O_{CRC}) > (M_{RB,min}^{PUCCH} - 1) \cdot N_{sc,ctrl}^{RB} \cdot N_{symbUCI}^{PUCCH} \cdot Q_m \cdot r$, where $N_{sc,ctrl}^{RB}, N_{symbUCI}^{PUCCH}, Q_m$, and r are defined in Subclause 9.2.5.2. If $_{(O_{ACK} + O_{CRC}) > (M_{RB}^{PUCCH} - 1) \cdot N_{sc,ctrl}^{RB} \cdot N_{symbUCI}^{PUCCH} \cdot Q_m \cdot r}$, the UE transmits the PUCCH over $M_{RB}^{PUCCE}$ PRBs.

| |
|---|
| 9.2.4 UE procedure for reporting SR |

A UE is configured by higher layer paremater SchedulingRequestResourceConfig a set
of configurations for SR in a PUCCH transmission using either PUCCH format 0 or
PUCCH format 1.
The UE is configured a PUCCH resource by SchedulingRequestResourceId providing a
PUCCH format 0 resource or a PUCCH format 1 resource as described in Subclause
9.2.1. The UE is also configured a periodicity $SR_{PERIODCITY}$ in symbols or slots and an
offset $SR_{OFFSET}$ in slots by periodicityAndOffset for a PUCCH transmission conveying
SR. If $SR_{PERIODCITY}$ is larger than one slot, the UE determines a SR transmission occasion
in a PUCCH to be in a slot with number $n_{s,f}^{\mu}$ [4, TS 38.211] in a frame with number $n_f$ $\text{if}_{(n_f \cdot N_{slot}^{frame\mu} + n_{s,f}^{\mu} - SR_{OFFSET}) \bmod SR_{PERIODCITY} = 0}$.

If $SR_{PERIODCITY}$ is one slot, the UE expects that $SR_{OFFSET} = 0$ and every slot is a SR
transmission occasion in a PUCCH.

TABLE 4-continued

If $SR_{PERIODICITY}$ is smaller than one slot, the UE determines a SR transmission occasion in a
PUCCH to start in a symbol with index l [4, TS 38.211] if
$(l - l_0$ mod $SR_{PERIODICITY})$mod $SR_{PERIODICITY} = 0$ where $l_o$ is the value of startingSymbolIndex.
If the UE determines that, for a SR transmission occasion in a PUCCH, the number of
symbols available for the PUCCH transmission in a slot is smaller than the value
provided by nrofSymbols, the UE does not transmit the PUCCH in the slot.
SR transmission occasions in a PUCCH are subject to the limitations for UE
transmissions described in Subclause 11.1 and Subclause 11.1.1.
The UE transmits a PUCCH in the PUCCH resource for the corresponding SR
configuration only when the UE transmits a positive SR. For a positive SR transmission
using PUCCH format 0, the UE transmits the PUCCH as described in [4, TS 38.211] by
obtaining $m_0$ as described for HARQ-ACK information in Subclause 9.2.3 and by
setting $m_{cs} = 0$. For a positive SR transmission using PUCCH format 1, the UE transmits
the PUCCH as described in [4, TS 38.211] by setting $b(0) = 0$.

9.2.5 UE procedure for reporting multiple UCI types

This Subclause is applicable to the case that a UE has overlapping resources for PUCCH
transmissions or for PUCCH and PUSCH transmissions and each PUCCH transmission
is over a single slot without repetition. Any case that a PUCCH transmission is with
repetitions over multiple slots is described in Subclause 9.2.6. If a UE is configured with
multiple PUCCH resources in a slot to transmit CSI reports
   if the UE is not provided multi-CSI-PUCCH-ResourceList or if PUCCH resources
   for transmissions of CSI reports do not overlap in the slot, the UE determines a
   first resource corresponding to a CSI report with the highest priority [6, TS
   38.214]
      if the first resource includes PUCCH format 2, and if there are
      remaining resources in the slot that do not overlap with the first
      resource, the UE determines a CSI report with the highest priority,
      among the CSI reports with corresponding resources from the
      remaining resources, and a corresponding second resource as an
      additional resource for CSI reporting
      if the first resource includes PUCCH format 3 or PUCCH format 4,
      and if there are remaining resources in the slot that include PUCCH
      format 2 and do not overlap with the first resource, the UE
      determines a CSI report with the highest priority, among the CSI
      reports with corresponding resources from the remaining resources,
      and a corresponding second resource as an additional resource for
      CSI reporting
   if the UE is provided multi-CSI-PUCCH-ResourceList and if any of the multiple
   PUCCH resources overlap, the UE multiplexes all CSI reports in a resource from
   the resources provided by multi-CSI-PUCCH-ResourceList, as described in
   Subclause 9.2.5.2.
A UE multiplexes HARQ-ACK information, with or without SR, and CSI resport(s) in a
same PUCCH if the UE is provided simultaneousHARQ-ACK-CSI; otherwise, the UE
drops the CSI report(s) and includes only HARQ-ACK information, with or without SR,
in the PUCCH. If the UE would transmit multiple PUCCHs in a slot that include
HARQ-ACK information and CSI report(s), the UE expects to be provided a same
configuration for simultaneousHARQ-ACK-CSI each of PUCCH formats 2, 3, and 4.
If a UE would multiplex CSI reports that include Part 2 CSI reports in a PUCCH
resource, the UE determines the PUCCH resource and a number of PRBs for the
PUCCH resource or a number of Part 2 CSI reports assuming that each of the CSI
reports indicates rank 1.
If a UE would transmit multiple overlapping PUCCHs in a slot or overlapping
PUCCH(s) and PUSCH(s) in a slot and, when applicable as described in Subclauses
9.2.5.1 and 9.2.5.2, the UE is configured to multiplex different UCI types in one
PUCCH, and at least one of the multiple overlapping PUCCHs or PUSCHs is in
response to a DCI format detection by the UE, the UE multiplexes all corresponding
UCI types if the following conditions are met. If one of the PUCCH transmissions or
PUSCH transmissions is in response to a DCI format detection by the UE, the UE
expects that the first symbol $s_0$ of the earliest PUCCH or PUSCH, among a group
overlapping PUCCHs and PUSCHs in the slot, satisfies the following timeline
conditions
   $S_0$ is not before a symbol with CP starting after
   $T_{proc,1}^{mux} = (N_1 + d_{1,J} + 1) \cdot (2048 + 144) \cdot \kappa \cdot 2^{-\mu} \cdot T_C$ after a last symbol of any corresponding
   PDSCH, where μ corresponds to the smallest SCS configuration among the SCS
   configuration of the PDCCH scheduling the PDSCH, the SCS configuration of the
   PDSCH, and the smallest SCS configuration for the group of overlapping
   PUCCHs and PUSCHs where the UE transmits HARQ-ACK information in
   response to the reception of the PDSCH
   $S_0$ is not before a symbol with CP starting after
   $T_{proc,release}^{mux} = (N + 1) \cdot (2048 + 144) \cdot \kappa \cdot 2^{-\mu} \cdot T_C$ after a last symbol of any corresponding SPS
   PDSCH release, where N is described in Subclause 10.2 and μ corresponds to
   the smallest SCS configuration among the SCS configuration of the PDCCH
   providing the SPS PDSCH release and the smallest SCS configuration for the
   group of overlapping PUCCHs or overlapping PUCCHs and PUSCHs where the
   UE transmits HARQ-ACK information in response to the detection of the SPS
   PDSCH release TABLE 4-continued if there is no aperiodic CSI report multiplexed in a PUSCH in the group of
overlapping PUCCHs and PUSCHs, $S_0$ is not before a symbol with CP starting
after $T_{proc,2}^{mux} = \max((N_2 + d_{2,1} + 1) \cdot (2048 + 144) \cdot \kappa \cdot 2^{-\mu} \cdot T_C, d_{2,2})$ after a last symbol of
    a PDCCH with the DCI format scheduling the PUSCH, and
    any PDCCH scheduling a PDSCH or SPS PDSCH release with
    corresponding HARQ-ACK information in an overlapping PUCCH
    in the slot
  where $\mu$ corresponds to the smallest SCS configuration among the SCS
    configuration of the PDCCHs and the smallest SCS of the
    overlapping PUCCHs and PUSCHs, and $d_{2,1} = d_{2,2} = 0$ if there is no
    overlapping PUSCH
if there is an aperiodic CSI report multiplexed in a PUSCH in the group of
overlapping PUCCHs and PUSCHs, $S_0$ is not before a symbol with CP starting
after $T_{proc,CSI}^{mux} = \max((Z + d) \cdot (2048 + 144) \cdot \kappa \cdot 2^{-\mu} \cdot T_C, d_{2,2})$ after a last symbol of
    a PDCCH with the DCI format scheduling the PUSCH, and
    any PDCCH scheduling a PDSCH or SPS PDSCH release with
    corresponding HARQ-ACK information in an overlapping PUCCH
    in the slot
  where $\mu$ corresponds to the smallest SCS configuration among the SCS
    configuration of the PDCCHs, the smallest SCS configuration for
    the group of the overlapping PUCCHs and PUSCHs, and the
    smallest SCS configuration of aperiodic CSI-RS associated with the
    DCI format scheduling the PUSCH, and $d = 2$ for $\mu = 0, 1, d = 3$
    for $\mu = 2$ and $d = 4$ for $\mu = 3$
$N_1, N_2, d_{1,1}, d_{2,1}, d_{2,2}$, and z are defined in [6, TS 38.214], and $\kappa$, $T_C$ are defined
in [4, TS 38.211].
If a UE would transmit multiple overlapping PUCCHs in a slot or overlapping
PUCCH(s) and PUSCH(s) in a slot, one of the PUCCHs includes HARQ-ACK
information in response to an SPS PDSCH reception, and any PUSCH is not in response
to a DCI format detection, the UE expects that the first symbol $S_0$ of the earliest
PUCCH or PUSCH satisfies the first of the previous timeline conditions with the
exception that components associated to a SCS configuration for a PDCCH scheduling a
PDSCH or a PUSCH are absent from the timeline conditions.
A UE does not expect a PUCCH or a PUSCH that is in response to a DCI format
detection to overlap with any other PUCCH or PUSCH that does not satisfy the above
timing conditions.
If there is one or more aperiodic CSI reports multiplexed on PUSCHs in the group of
overlapping PUCCHs and PUSCHs and if symbol $S_0$ is before symbol $Z'^{mux}_{ref}$ that is a
next uplink symbol with CP starting after $Z'^{mux}_{proc,CSI} = (Z' + d) \cdot (2048 + 144) \cdot \kappa \cdot 2^{-\mu} \cdot T_C$ after the
end of the last symbol of
  the last symbol of aperiodic CSI-RS resource for channel measurements, and
  the last symbol of aperiodic CSI-IM used for interference measurements, and
  the last symbol of aperiodic NZP CSI-RS for interference measurements, when
    aperiodic CSI-RS is used for channel measurement for triggered CSI report $_n$
the UE is not required to update the CSI report for the triggered CSI report n Z' is
defined in [6, TS 38.214] and $\mu$ corresponds to the smallest SCS configuration among
the SCS configurations of the PDCCHs scheduling the PUSCHs, the smallest SCS
configuration of aperiodic CSI-RSs associated with DCI formats provided by the
PDCCHs triggering the aperiodic CSI reports, and the smallest SCS configuration of the
overlapping PUCCHs and PUSCHs and $d = 2$ for $\mu = 0, 1, d = 3$ for $\mu = 2$ and $d = 4$
for $\mu = 3$ .
If a UE would transmit multiple PUCCHs in a slot that include HARQ-ACK
information, SR, and CSI reports and any PUCCH with HARQ-ACK information in the
slot satisfies the above timing conditions and does not overlap with any other PUCCH or
PUSCH in the slot that does not satisfy the above timing conditions, the UE multiplexes
HARQ-ACK information, SR, and CSI reports and determines corresponding
PUCCH(s) for transmission in the slot according to the following pseudo-code. If the
multiple PUCCHs do not include HARQ-ACK information and do not overlap with any
PUSCH transmission by the UE in response to a DCI format detection by the UE, the
timing conditions do not apply.
If
  a UE is not provided multi-CSI-PUCCH-ResourceList, and
  a resource for a PUCCH transmission with HARQ-ACK information in response
  to SPS PDSCH reception and/or a resource for a PUCCH associated with a SR
  occasion overlap in time with two resources for respective PUCCH transmissions
  with two CSI reports, and
  there is no resource for a PUCCH transmission with HARQ-ACK information in
  response to a DCI format detection that overlaps in time with any of the previous
  resources, and
  the following pseudo code results to the UE attempting to determine a single
  PUCCH resource from the HARQ-ACK and/or the SR resource and the two
  PUCCH resources with CSI reports
the UE
  multiplexes the HARQ-ACK information and/or the SR in the resource for the
  PUCCH transmission with the CSI report having the higher priority, and
  does not transmit the PUCCH with the CSI report having the lower priority
Set Q to the set of resources for transmission of corresponding PUCCHs in a single slot
without repetitions where
  a resource with earlier first symbol is placed before a resource with later first
  symbol TABLE 4-continued for two resources with same first symbol, the resource with longer duration is
placed before the resource with shorter duration
for two resources with same first symbol and same duration, the placement is
arbitrary
    the above three steps for the set Q are according to a subsequent
    pseudo-code for a function order(Q)
a resource for negative SR transmission that does not overlap with a resource for
HARQ-ACK or CSI transmission is excluded from set Q
if the UE is not provided simultaneousHARQ-ACK-CSI and resources for
transmission of HARQ-ACK information include PUCCH format 0 or PUCCH
format 2, resources that include PUCCH format 2, or PUCCH format 3, or
PUCCH format 4 for transmission of CSI reports are excluded from the set Q if
they overlap with any resource from the resources for transmission of HARQ-
ACK information
if the UE is not provided simultaneousHARQ-ACK-CSI and at least one of the
resources for transmission of HARQ-ACK information includes PUCCH format 1,
PUCCH format 3, or PUCCH format 4
    resources that include PUCCH format 3 or PUCCH format 4 for
    transmission of CSI reports are excluded from the set Q
    resources that include PUCCH format 2 for transmission of CSI
    reports are excluded from the set Q if they overlap with any
    resource from the resources for transmission of HARQ-ACK
    information
Set $c(Q)$ to the cardinality of Q
Set $Q(j, 0)$ to be the first symbol of resource $Q(j)$ in the slot
Set $L(Q(j))$ to be the number of symbols of resource $Q(j)$ in the slot
Set $j = 0$ - index of first resource in set Q
Set $o = 0$ - counter of overlapped resources
while $j \leq c(Q) - 1$
  if $j < c(Q) - 1$ and resource $Q(j - o)$ overlaps with resource $Q(j + 1)$
    $o = o + 1$
    $j = j + 1$
  else
    if o>0
    determine a single resource for multiplexing UCI associated with resources
      $\{Q(j - o), Q(j - o +1), \ldots, Q(j)\}$ as described in Subclauses 9.2.5.1 and 9.2.5.2
    set the index of the single resource to j
    $Q = Q\backslash\{Q(j - o), Q(j - o + 1), \ldots, Q(j - 1)\}$
    j=0 % start from the beginning after reordering unmerged resources at next
      step
    $o = 0$
    order(Q) % function that re-orders resources in current set Q
    Set $c(Q)$ to the cardinality of Q
    else
    $j = j + 1$
    end if
  end if
end while
The function order(Q) performs the following pseudo-code
{
  k=0
  while $k < c(Q) - 1$ % the next two while loops are to re-order the unmerged resources
    l=0
    while $l < c(Q) - 1 - k$
  if $Q(l,0) > Q(l + 1,0)$ OR $(Q(l,0) = Q(l + 1,0)$ & $L(Q(l)) < L(Q(l + 1))$
    temp=Q(l)
    Q(l)=Q(l + 1)
    Q(l + 1) = temp
  end if
    l=l+1
    end while
  k=k+1
  end while
}
For each PUCCH resource in the set Q that satisfies the aforementioned timing
conditions, when applicable,
  the UE transmits a PUCCH using the PUCCH resource if the PUCCH resource
  does not overlap in time with a PUSCH transmission after multiplexing UCI
  following the procedures described in Subclauses 9.2.5.1 and 9.2.5.2
  the UE multiplexes HARQ-ACK information and/or CSI reports in a PUSCH if
  the PUCCH resource overlaps in time with a PUSCH transmission, as described in
  Subclause 9.3, and does not transmit SR. In case the PUCCH resource overlaps in
  time with multiple PUSCH transmissions, the PUSCH for multiplexing HARQ-
  ACK information and/or CSI is selected as described in Subclause 9. If the
  PUSCH transmission by the UE is not in response to a DCI format detection and
  the UE multiplexes only CSI reports, the timing conditions are not applicable
  the UE does not expect the resource to overlap with a second resource of a
  PUCCH transmission over multiple slots if the resource is obtained from a group
  of resources that do not overlap with the second resource.

TABLE 4-continued

Subclauses 9.2.5.1 and 9.2.5.2 assume the following
   resources for transmissions of UCI types, prior to multiplexing or dropping,
   overlap in a slot
   multiplexing conditions of corresponding UCI types in a single PUCCH are
   satisfied, and
   the UE does not transmit any time-overlapping PUSCH in a same frequency band
   in the slot.

9.2.5.1 UE procedure for multiplexing HARQ-ACK or CSI and SR in a PUCCH

In the following, a UE is configured to transmit K PUCCHs for respective K SRs in a slot, as determined by a set of schedulingRequeslResourceId, with SR transmission occasions that would overlap with a transmission of a PUCCH with HARQ-ACK information from the UE in the slot or with a transmission of a PUCCH with CSI report(s) from the UE in the slot.

If a UE would transmit a PUCCH with positive SR and at most two HARQ-ACK information bits in a resource using PUCCH format 0, the UE transmits the PUCCH in the resource using PUCCH format 0 in PRB(s) for HARQ-ACK information as described in Subclause 9.2.3. The UE determines a value of $m_o$ and $m_{cs}$ for computing a value of cyclic shift α [4, TS 38.211] where $m_o$ is provided by initialcyclicshift of PUCCH-format0, and $m_{cs}$ is determined from the value of one HARQ-ACK information bit or from the values of two HARQ-ACK information bits as in Table 9.2.5-1 and Table 9.2.5-2, respectively.

If the UE would transmit negative SR and a PUCCH with at most two HARQ-ACK information bits in a resource using PUCCH format 0, the UE transmits the PUCCH in the resource using PUCCH format 0 for HARQ-ACK information as described in Subclause 9.2.3.

Table 9.2.5-1: Mapping of values for one HARQ-ACK information bit and positive SR to sequences for PUCCH format 0

| HARQ-ACK Value | 0 | 1 |
| --- | --- | --- |
| Sequence cyclic shift | $m_{cs} = 3$ | $M_{cs} = 9$ |

Table 9.2.5-2: Mapping of values for two HARQ-ACK information bits and positive SR to sequences for PUCCH format 0

| HARQ-ACK Value | {0, 0} | {0, 1} | {1, 1} | {1, 0} |
| --- | --- | --- | --- | --- |
| Sequence cyclic shift | $m_{cs} = 1$ | $m_{cs} = 4$ | $m_{cs} = 7$ | $m_{cs} = 10$ |

If a UE would transmit positive or negative SR in a resource using PUCCH format 0 and HARQ-ACK information bits in a resource using PUCCH format 1 in a slot, the UE transmits only a PUCCH with the HARQ-ACK information bits in the resource using PUCCH format 1.

If the UE would transmit positive SR in a first resource using PUCCH format 1 and at most two HARQ-ACK information bits in a second resource using PUCCH format 1 in a slot, the UE transmits a PUCCH with HARQ-ACK information bits in the first resource using PUCCH format 1 as described in Subclause 9.2.3. If a UE would transmit negative SR in a resource using PUCCH format 1 and at most two HARQ-ACK information bits in a resource using PUCCH format 1 in a slot, the UE transmits a PUCCH in the resource using PUCCH format 1 for HARQ-ACK information as described in Subclause 9.2.3.

If a UE would transmit a PUCCH with $O_{ACK}$ HARQ-ACK information bits in a resource using PUCCH format 2 or PUCCH format 3 or PUCCH format 4 in a slot, as described in Subclause 9.2.3, $\lceil \log_2 (K + 1) \rceil$ bits representing a negative or positive SR, in ascending order of the values of schedulingRequestResourceId, are appended to the HARQ-ACK information bits and the UE transmits the combined $Q_{UCI} = O_{ACK} + \lceil \log(K + 1) \rceil$ UCI bits in a PUCCH using a resource with PUCCH format 2 or PUCCH format 3 or PUCCH format 4 that the UE determines as described in Subclauses 9.2.1 and 9.2.3. An all-zero value for the $\lceil \log_2(K + 1) \rceil$ bits represents a negative SR value across all K SRs.

If a UE would transmit a PUCCH with $O_{CSI}$ CSI report bits in a resource using PUCCH format 2 or PUCCH format 3 or PUCCH format 4 in a slot, $\lceil \log_2(K + 1) \rceil$ bits representing corresponding negative or positive SR, in ascending order of the values of schedulingRequestResourceId, are prepended to the CSI information bits as described in Subclause 9.2.5.2 and the UE transmits a PUCCH with the combined $O_{UCI} = \lceil \log_2(K + 1) \rceil + O_{CSI}$ UCI bits in a resource using the PUCCH format 2 or PUCCH format 3 or PUCCH format 4 for CSI reporting. An all-zero value for the $\lceil \log_2(K + 1) \rceil$ bits represents a negative SR value across all K SRs.

If a UE transmits a PUCCH with $O_{ACK}$ HARQ-ACK information bits, $O_{SR} = \lceil \log_2 (K + 1) \rceil$ SR bits, and $O_{CRC}$ CRC bits using PUCCH format 2 or PUCCH format 3 in a PUCCH resource that includes $M_{RB}^{PUCCE}$ PRBs, the UE determines a number of PRBs $M_{RBmin}^{PUCCH}$ for the PUCCH transmission to be the minimum number of PRBs, that is smaller than or equal to a number of PRBs provided respectively by nrofPRBs in PUCCH-format2 or nrofPRBs in PUCCH-format3 and starts from the first PRB from the number of PRBs, TABLE 4-continued that results to $(O_{ACK} + O_{SR} + O_{CRC}) \le M_{RB,min}^{PUCCH} \cdot N_{sc,ctrl}^{RB} \cdot N_{symbUCI}^{PUCCH} \cdot Q_m \cdot r$ and, if $M_{RB}^{PUCCH} > 1$, $(O_{ACK} + O_{SR} + O_{CRC}) > (M_{RB,min}^{PUCCH} - 1) \cdot N_{sc,ctrl}^{RB} \cdot N_{symbUCI}^{PUCCH} \cdot Q_m \cdot r$, where $N_{sc,ctrl}^{RB}, N_{symbUCI}^{PUCCH}$, $Q_m$, and r are defined in Subclause 9.2.5.2. If $(O_{ACK} + O_{SR} + O_{CRC}) > (M_{RB}^{PUCCH} - 1) \cdot N_{sc,ctrl}^{RB} \cdot N_{symbUCI}^{PUCCH} \cdot Q_m \cdot r$, the UE transmits the PUCCH over the $M_{RB}^{PUCCE}$ PRBs.

9.2.5.2 UE procedure for multiplexing HARQ-ACK/SR/CSI in a PUCCH

For a transmission occasion of a single CSI report, a PUCCH resource is provided by pucch-CSI-ResourceList. For a transmission occasion of multiple CSI reports, corresponding PUCCH resources can be provided by multi-CSI-PUCCH-ResourceList. If a UE is provided only one PUCCH resource set for transmission of HARQ-ACK information in response to PDSCH reception scheduled by a DCI format or in response to a SPS PDSCH release, the UE does not expect to be provided simultaneousHARQ-ACK-CSI.
A UE is configured by maxCodeRate a code rate for multiplexing HARQ-ACK, SR, and CSI report(s) in a PUCCH transmission using PUCCH format 2, PUCCH format 3, or PUCCH format 4.
If a UE transmits CSI reports using PUCCH format 2, the UE transmits only wideband CSI for each CSI report [6, TS 38.214]. In the following, a Part 1 CSI report refers either to a CSI report with only wideband CSI or to a Part 1 CSI report with wideband CSI and sub-band CSI.
Denote as
$O_{ACK}$ a total number of HARQ-ACK information bits, if any
$O_{SR}$ a total number of SR bits. $O_{SR} = 0$ if there is no scheduling request bit; otherwise, $O_{SR} = \lceil \log_2(K + 1) \rceil$ as described in Subclause 9.2.5.1

$$O_{CSI} = \sum_{n=1}^{N_{CSI}^{total}} (O_{CSI-part1,n} + O_{CSI-part2,n}),$$

where $O_{CSI\text{-}part1, n}$ is a number of Part 1 CSI report bits
for CSI report with priority value $_n$, $O_{CSI\text{-}part2, n}$ is a number of Part 2 CSI report bits, if any, for CSI report with priority value $_n$ [6, TS 38.214], and $N_{CSI}^{total}$ is a number of CSI reports that include overlapping CSI reports
$O_{CRC} = O_{CRC, CSI\text{-}part1} + O_{CRC, CSI\text{-}part2}$, where $O_{CRC, CSI\text{-}part1}$ is a number of CRC bits, if any, for encoding HARQ-ACK, SR and Part 1 CSI report bits and $O_{CRC, CSI\text{-}part2}$ is a number of CRC bits, if any, for encoding Part 2 CSI report bits
In the following
r is a code rate given by maxCodeRate as in Table 9.2.5.2-1.
$M_{RB}^{PUCCH}$ is a number of PRBs for PUCCH format 2, or PUCCH format 3, or PUCCH format 4, respectively, where $M_{RB}^{PUCCH}$ is provided by nrofPRBs in PUCCH-format2 for PUCCH format 2 or by nrofPRBs in PUCCH-format3 for PUCCH format 3, and $M_{RB}^{PUCCH} = 1$ for PUCCH format 4
$N_{sc,ctrl}^{RB} = N_{sc}^{RB} - 4$ for PUCCH format 2, $N_{sc,ctrl}^{RB} = N_{sc}^{RB}$ for PUCCH format 3, and $N_{sc,ctrl}^{RB} = N_{sc}^{RB}/N_{SF}^{PUCCH}$ for PUCCH format 4, where $N_{sc}^{RB}$ is a number of subcarriers per resource block [4, TS 38.211]
$N_{symb\text{-}UCI}^{PUCCH}$ is equal to a number of PUCCH symbols $N_{symb}^{PUCCH,}$ for PUCCH format 2 provided by nrofSymbols in PUCCH-format2. For PUCCH format 3 or for PUCCH format 4, $N_{symb\text{-}UCI}^{PUCCH}$ is equal to a number of PUCCH symbols $N_{symb}^{PUCCH,}$ for PUCCH format 3 or equal to a number of PUCCH symbols $N_{symb}^{PUCCH,4}$ for PUCCH format 4 provided by nrofSymbols in PUCCH-format3 or nrofSymbols in PUCCH-format4, respectively, after excluding a number of symbols used for DM-RS transmission for PUCCH format 3 or for PUCCH format 4, respectively [4, TS 38.211]
$Q_m = 1$ if pi/2-BPSK is the modulation scheme and $Q_m = 2$ if QPSK is the modulation scheme as indicated by pi2BPSK for PUCCH format 3 or PUCCH format 4. For PUCCH format 2, $Q_m = 2$
If a UE has one or more CSI reports and zero or more HARQ-ACK/SR information bits to transmit in a PUCCH where the HARQ-ACK, if any, is in response to a PDSCH reception without a corresponding PDCCH
  if any of the CSI reports are overlapping and the UE is provided by multi-CSI-PUCCH-ResourceList with J ≤ 2 PUCCH resources in a slot, for PUCCH format 2 and/or PUCCH format 3 and/or PUCCH format 4, as described in Subclause 9.2.1, where the resources are indexed according to an ascending order for the product of a number of corresponding REs, modulation order $Q_m$, and configured code rate r ;

TABLE 4-continued if $(O_{ACK} + O_{SR} + O_{CSI} + O_{CRC}) \leq (M_{RB}^{PUCCH} \cdot N_{sc,ctrl}^{RB} \cdot N_{symb \cdot UCI}^{PUCCH} \cdot Q_m \cdot r)_0$, the UE
    uses PUCCH format 2 resource 0, or the PUCCH format 3
    resource 0, or the PUCCH format 4 resource 0 else if $(O_{ACK} + O_{SR} + O_{CSI} + O_{CRC}) > (M_{RB}^{PUCCH} \cdot N_{sc,ctrl}^{RB} \cdot N_{symb-UCI}^{PUCCH} \cdot Q_m \cdot r)_j$, and $$(O_{ACK} + O_{SR} + O_{CSI} + O_{CRC}) \leq (M_{RB}^{PUCCH} \cdot N_{sc,ctrl}^{RB} \cdot N_{symb-UCI}^{PUCCH} \cdot Q_m \cdot r)_{j+1},$$

$0 \leq j < J - 1$, the UE transmits a PUCCH conveying HARQ-ACK
    information, SR and CSI report(s) in a respective PUCCH where the
    UE uses the PUCCH format 2 resource $j + 1$, or the PUCCH
    format 3 resource $j + 1$, or the PUCCH format 4 resource $j + 1$
    else the UE uses the PUCCH format 2 resource $J - 1$, or the PUCCH
    format 3 resource $J - 1$, or the PUCCH format 4 resource $J - 1$ and
    the UE selects $N_{CSI}^{reported}$ CSI report(s) for transmission together with
    HARQ-ACK information and SR, when any, in ascending priority
    value as described in [6, TS 38.214]
  else, the UE transmits the $O_{ACK} + O_{SR} + O_{CSI} + O_{CRC}$ bits in a PUCCH resource provided
  by pucch-CSI-ResourceList and determined as described in Subclause 9.2.5
If a UE has HARQ-ACK, SR and wideband or sub-band CSI reports to transmit and the
UE determines a PUCCH resource with PUCCH format 2, or the UE has HARQ-ACK,
SR and wideband CSI reports [6, TS 38.214] to transmit and the UE determines a
PUCCH resource with PUCCH format 3 or PUCCH format 4, where
  the UE determines the PUCCH resource using the PUCCH resource indicator field
  [5, TS 38.212] in a last DCI format 1_0 or DCI format 1_1, from DCI formats 1_0
  or DCI formats 1_1 that have a value of a PDSCH-to-HARQ_feedback timing
  indicator field indicating a same slot for the PUCCH transmission, from a PUCCH
  resource set provided to the UE for HARQ-ACK transmission, and
  the UE determines the PUCCH resource set as described in Subclause 9.2.1 and
  Subclause 9.2.3 for $O_{UCI}$ UCI bits
and if $(O_{ACK} + O_{SR} + O_{CSI-part1} + O_{CRC,CSI-part1}) \leq$ $$M_{RB}^{PUCCH} \cdot N_{sc,ctrl}^{RB} \cdot N_{symb-UCI}^{PUCCH} \cdot Q_m \cdot r,$$

the UE transmits the HARQ-ACK, SR, and CSI reports bits by selecting the minimum number
  $M_{RB,min}^{PUCCH}$ of the $M_{RB}^{PUCCH}$ PRBs satisfying $$(O_{ACK} + O_{SR} + O_{CSI-part1} + O_{CRC,CSI-part1}) \leq _{RB,min}^{PUCCH} \cdot N_{sc,ctrl}^{RB} \cdot N_{symb-UCI}^{PUCCH} \cdot Q_m \cdot r$$

as described in Subclauses 9.2.3 and 9.2.5.1;
  else, the UE selects $N_{CSI}^{reported}$ CSI report(s), from the $N_{CSI}^{total}$ CSI reports, for
  transmission together with HARQ-ACK and SR in ascending priority value [6, TS
  38.214], where the value of $N_{CSI}^{reported}$ satisfies $$\left(O_{ACK} + O_{SR} + \sum_{n=1}^{N_{CSI}^{reported}} O_{CSI-part1,n} + O_{CRC,CSI-part1,N}\right) \leq$$

$$M_{RB}^{PUCCH} \cdot N_{sc,ctrl}^{RB} \cdot N_{symb-UCI}^{PUCCH} \cdot Q_m \cdot r$$

and $$\left(O_{ACK} + O_{SR} + \sum_{n=1}^{N_{CSI}^{reported}+1} O_{CSI-part1,n} + O_{CRC,CSI-part1,N+1}\right) >$$

$$M_{RB}^{PUCCH} \cdot N_{sc,ctrl}^{RB} \cdot N_{symb-UCI}^{PUCCH} \cdot Q_m \cdot r,$$

where $O_{CRC,CSI-part1,N}$ is a number of CRC bits corresponding to $$O_{ACK} + O_{SR} + \sum_{n=1}^{N_{CSI}^{reported}} O_{CSI-part1,n}$$

UCI bits, and $O_{CRC,CSI-part1,N+1}$ is a number of CRC bits corresponding to $$O_{ACK} + O_{SR} + \sum_{n=1}^{N_{CSI}^{reported}+1} O_{CSI-part1,n}$$

UCI bits.

TABLE 4-continued

If a UE has HARQ-ACK, SR and sub-band CSI reports to transmit and the UE
determines a PUCCH resource with PUCCH format 3 or PUCCH format 4, where
  the UE determines the PUCCH resource using the PUCCH resource indicator field
  [5, TS 38.212] in a last DCI format 1_0 or DCI format 1_1, from DCI formats 1_0
  or DCI formats 1_1 that have a value of a PDSCH-to-HARQ_feedback timing
  indicator field indicating a same slot for the PUCCH transmission, from a PUCCH
  resource set provided to the UE for HARQ-ACK transmission, and
  the UE determines the PUCCH resource set as described in Subclause 9.2.1 and
  Subclause 9.2.3 for $O_{UCI}$ UCI bits
and if $(O_{ACK} + O_{SR} + O_{CSI} + O_{CRC}) \leq M_{RB}^{PUCCH} \cdot N_{sc,ctrl}^{RB} \cdot N_{symb-UCI}^{PUCCH} \cdot Q_m \cdot r$, the UE transmits the HARQ-ACK, SR and the $N_{CSI}^{total}$ CSI report bits by selecting the minimum number
$M_{RB,min}^{PUCCH}$ of PRBs from the $M_{RB}^{PUCCH}$ PRBs satisfying $(O_{ACK} + O_{SR} + O_{CSI} + O_{CRC}) \leq M_{RB,min}^{PUCCH} \cdot N_{sc,ctrl}^{RB} \cdot N_{symb-UCI}^{PUCCH} \cdot Q_m \cdot r$ as described in Subclauses 9.2.3 and 9.2.5.1
else.
  if for $N_{CSI\text{-}part2}^{reported} > 0$ Part 2 CSI report priority value(s), it is $$\sum_{n=1}^{N_{CSI\text{-}part2}^{reported}} O_{CSI\text{-}part2,n} + O_{CRC,CSI\text{-}part2,N} \leq$$

$$\left( M_{RB}^{PUCCH} \cdot N_{sc,ctrl}^{RB} \cdot N_{symb-UCI}^{PUCCH} - \left[ \left( O_{ACK} + O_{SR} + \sum_{n=1}^{N_{CSI}^{total}} O_{CSI\text{-}part1,n} + O_{CRC,C} \right) \right. \right.$$

and $$\sum_{n=1}^{N_{CSI\text{-}part2}^{reported}+1} O_{CSI\text{-}part2,n} + O_{CRC,CSI\text{-}part2,N+1} >$$

, $$\left( M_{RB}^{PUCCH} \cdot N_{sc,ctrl}^{RB} \cdot N_{symb-UCI}^{PUCCH} - \left[ \left( O_{ACK} + O_{SR} + \sum_{n=1}^{N_{CSI}^{total}} O_{CSI\text{-}part1,n} + O_{CRC,CS} \right) \right. \right.$$

the UE selects the first $N_{CSI\text{-}part2}^{reported}$ Part 2 CSI reports, according to respective
  priority value(s) [6, TS 38.214], for transmission together with the
  HARQ-ACK, SR and $N_{CSI}^{tota}$ Part 1 CSI reports, where $O_{CSI\text{-}part1,n}$ is
  the number of Part 1 CSI report bits for the $n_{th}$ CSI report and
  $O_{CSI\text{-}part2,n}$ is the number of Part 2 CSI report bits for the $n_{th}$ CSI
  report priority value, $O_{CRC,CSI\text{-}part2,N}$ is a number of CRC bits corresponding to $\sum_{n=1}^{N_{CSI\text{-}part2}^{reported}} O_{CSI\text{-}part2,n}$, and $O_{CRC,CSI\text{-}part2,N+1}$ is a number of CRC bits corresponding to $\sum_{n=1}^{N_{CSI\text{-}part2}^{reported}+1} O_{CSI\text{-}part2,n}$ else, the UE drops all Part 2 CSI reports and selects $N_{CSI\text{-}part1}^{reported}$ Part 1
  CSI report(s), from the $N_{CSI}^{total}$ CSI reports in ascending priority value
  [6, TS 38.214], for transmission together with the HARQ-ACK and
  SR information bits where the value of $N_{CSI\text{-}part1}^{reported}$ satisfies $$\left( O_{ACK} + O_{SR} + \sum_{n=1}^{N_{CSI\text{-}part1}^{reported}} O_{CSI\text{-}part1,n} + O_{CRC,CSI\text{-}part1,N} \right) \leq$$

$M_{RB}^{PUCCH} \cdot N_{sc,ctrl}^{RB} \cdot N_{symb-UCI}^{PUCCH} \cdot Q_m \cdot r$ TABLE 4-continued and $$\left( O_{ACK} + O_{SR} + \sum_{n=1}^{N_{CSI-part1}^{reported}+1} O_{CSI-part1,n} + O_{CRC,CSI-part1,N+1} \right) >$$

$$M_{RB}^{PUCCH} \cdot N_{sc,ctrl}^{RB} \cdot N_{symb-UCI}^{PUCCH} \cdot Q_m \cdot r,$$

where $O_{CRC,CSIpart1,N}$ is a number of CRC bits corresponding to $$O_{ACK} + O_{SR} + \sum_{n=1}^{N_{CSI-part1}^{reported}} O_{CSI-part1,n}$$

UCI bits, and $O_{CRC,CSI-part1,N+1}$ is a number of

CRC bits corresponding to $$O_{ACK} + O_{SR} + \sum_{n=1}^{N_{CSI-part1}^{reported}+1} O_{CSI-part1,n}$$

UCI bits

Table 9.2.5.2-1: Code rate r corresponding to value maxCodeRate

| maxCodeRate | Code rate r |
|---|---|
| 0 | 0.08 |
| 1 | 0.15 |
| 2 | 0.25 |
| 3 | 0.35 |
| 4 | 0.45 |
| 5 | 0.60 |
| 6 | 0.80 |

Figure 4:
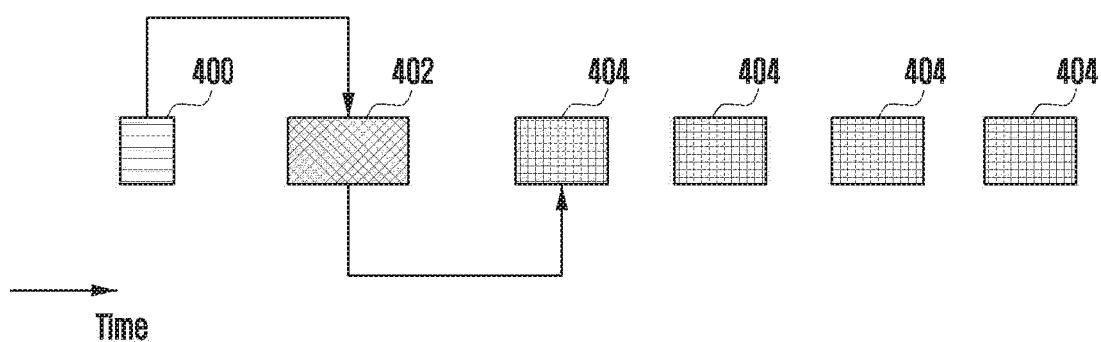
FIG. 4 is a diagram illustrating a method for repeatedly transmitting a PUCCH according to an embodiment of the disclosure.

FIG. 4 is a diagram illustrating a method for repeatedly transmitting a PUCCH according to an embodiment of the disclosure.

Although similar to FIG. 3, there are some differences from FIG. 3 in that a terminal performs repetitive transmission when transmitting a PUCCH. In general, a transmission power of a terminal is lower than a transmission power of a base station, and therefore a possibility that uplink coverage is smaller than downlink coverage exists. In order to solve such a problem, a repetitive transmission technique may be considered in terms of time. When repetitive transmission is performed, a receiver may receive more energy, and therefore demodulation/decoding performance may be further improved.

Referring to FIG. 4, a situation of scheduling a PDCCH 402 and a PUCCH 404 based on DCI transmitted via a PDCCH 400 is illustrated. The PUCCH 404 is repeatedly transmitted 4 times, and in the 5G or NR system, repetitive transmission of the PUCCH is basically repeated with the same starting point and length in units of slots.

Repetitive transmission of the PUCCH may be represented as shown in Table 5 below.

TABLE 5

9.2.6 PUCCH repetition procedure

For PUCCH formats 1, 3, or 4, a UE can be configured a number of slots, $N_{PUCC}^{repeat}$, for repetitions of a PUCCH transmission by respective nrofSlots.
For $N_{PUCCH}^{repeat} > 1$,
- the UE repeats the PUCCH transmission with the UCI over $N_{PUCC}^{repeat}$ slots
- a PUCCH transmission in each of the $N_{PUCC}^{repeat}$ slots has a same number of consecutive symbols, as provided by nrofSymbols in PUCCH-format1, nrofSymbols in PUCCH-format3, or nrofSymbols in PUCCH-format4
- a PUCCH transmission in each of the $N_{PUCC}^{repeat}$ slots has a same first symbol, as provided by startingSymbolIndex in PUCCH-format 1, startingSymbolIndex in PUCCH-format3, or startingSymbolIndex in PUCCH-format4
- the UE is configured by inter slotFrequencyHopping whether or not to perform frequency hopping for PUCCH transmissions in different slots
  - if the UE is configured to perform frequency hopping for PUCCH transmissions across different slots
    - the UE performs frequency hopping per slot
    - the UE transmits the PUCCH starting from a first PRB, provided by startingPRB, in slots with even number and starting from the second PRB, provided by secondHopPRB, in slots with odd number. The slot indicated to the UE for the first PUCCH transmission has number 0 and each subsequent slot until the UE transmits the PUCCH in $N_{PUCC}^{repeat}$ slots is counted regardless of whether or not the UE transmits the PUCCH in the slot TABLE 5-continued 9.2.6 PUCCH repetition procedure

- the UE does not expect to be configured to perform frequency hopping for a
    PUCCH transmission within a slot
        - If the UE is not configured to perform frequency hopping for
        PUCCH transmissions across different slots and if the UE is configured
        to perform frequency hopping for PUCCH transmissions within a slot,
        the frequency hopping pattern between the first PRB and the second PRB
        is same within each slot
If the UE determines that, for a PUCCH transmission in a slot, the number of symbols
available for the PUCCH transmission is smaller than the value provided by nrofSymbols for
the corresponding PUCCH format, the UE does not transmit the PUCCH in the slot.
A SS/PBCH block symbol is a symbol indicated to a UE by ssb-PositionsInBurst in SIB1 or
ssb-PositionsInBurst in ServingCellConfigCommon.
For unpaired spectrum, the UE determines the $N_{PUCC}^{repeat}$ slots for a PUCCH transmission starting
from a slot indicated to the UE as described in Subclause 9.2.3 and having
    - an UL symbol, as described in Subclause 11.1, or flexible symbol that is not SS/PBCH
    block symbol provided by startingSymbolIndex in PUCCH-format1, or in PUCCH-
    format3, or in PUCCH-format4 as a first symbol, and
    - consecutive UL symbols, as described in Subclause 11.1, or flexible symbols that are
    not SS/PBCHblock symbols, starting from the first symbol, equal to or larger than a
    number of symbols provided by nrofsymbols in PUCCH-format1, or in PUCCH-
    format3, or in PUCCH-format4
For paired spectrum, the UE determines the $N_{PUCC}^{repeat}$ slots for a PUCCH transmission as the
$N_{PUCC}^{repeat}$ consecutive slots starting from a slot indicated to the UE as described in Subclause
9.2.3.
If a UE would transmit a PUCCH over a first number $N_{PUCC}^{repeat}>1$ of slots and the UE would
transmit a PUSCH over a second number of slots, and the PUCCH transmission would
overlap with the PUSCH transmission in one or more slots, and the conditions in Subclause
9.2.5 for multiplexing the UCI in the PUSCH are satisfied in the overlapping slots, the UE
transmits the PUCCH and does not transmit the PUSCH in the overlapping slots.
A UE does not multiplex different UCI types in a PUCCH transmission with repetitions over
$N_{PUCC}^{repeat}>1$ slots. If a UE would transmit a first PUCCH over more than one slot and at least a
second PUCCH over one or more slots, and the transmissions of the first PUCCH and the
second PUCCH would overlap in a number of slots then, for the number of slots and with
UCI type priority of HARQ-ACK > SR > CSI with higher priority > CSI with lower priority
    - the UE does not expect the first PUCCH and any of the second PUCCHs to start at a
    same slot and include a UCI type with same priority
    - if the first PUCCH and any of the second PUCCHs include a UCI type with same
    priority, the UE transmits the PUCCH starting at an earlier slot and does not transmit
    the PUCCH starting at a later slot
    - if the first PUCCH and any of the second PUCCHs do not include a UCI type with
    same priority, the UE transmits the PUCCH that includes the UCI type with higher
    priority and does not transmit the PUCCHs that include the UCI type with lower
    priority
A UE does not expect a PUCCH that is in response to a DCI format detection to overlap with
any other PUCCH that does not satisfy the corresponding timing conditions in Subclause
9.2.5.
If a UE would transmit a PUCCH over $N_{PUCC}^{repeat}$ slots and the UE does not transmit the PUCCH
in a slot from the $N_{PUCC}^{repeat}$ slots due to overlapping with another PUCCH transmission in the
slot, the UE counts the slot in the number of $N_{PUCC}^{repeat}$ slots.

Hereinafter, an example in which the terminal configures PUCCH resource and PUCCH format related information via higher layer signaling (RRC) will be described. The PUCCH resource configuration information may include at least one of a PUCCH resource identifier (resourceId) for resource allocation, a position identifier of a starting PRB, information on whether intraSlotfrequencyHopping is supported, and information on a supported PUCCH format.

The PUCCH resource identifier is an identifier indicating a position of an actual PUCCH resource, and the position identifier of the starting PRB is an identifier indicating a position of the PRB in one carrier, and is a parameter indicating whether the intraSlotfrequencyHopping is supported. The PUCCH format is a short PUCCH, and 0, 2 and a long PUCCH format may include 1, 3, and 4. Various embodiments described in the disclosure may be understood in the form of adding or expanding the above identifiers, and may be added in the form of a new PUCCH format.

In one embodiment of the PUCCH format, PUCCH format1 may include initialCyclicShift, nrofSymbols, startingSymbolsIndex, and timeDomainOCC information. For design of a new PUCCH format, at least one parameter or value may be modified or added based on the above-mentioned information.

Table 6 below shows configuration information related to PUCCH resource.

TABLE 6

| | |
|---|---|
| PUCCH-Resource ::= | SEQUENCE { |
| pucch-ResourceId | PUCCH-ResourceId, |
| startingPRB | PRB-Id, |
| intraSlotFrequencyHopping | ENUMERATED { enabled } |
| OPTIONAL, -- Need R | |
| secondHopPRB | PRB-Id |
| OPTIONAL, -- Need R | |
| format | CHOICE { |
| format0 | PUCCH-format0, |
| format1 | PUCCH-format1, |
| format2 | PUCCH-format2, |
| format3 | PUCCH-format3, |
| format4 | PUCCH-format4 |
| } | |
| } | |

TABLE 6-continued

```
PUCCH-format1 ::=            SEQUENCE {
    initialCyclicShift       INTEGER(0..11),
    nrofSymbols              INTEGER (4..14),
    startingSymbolIndex      INTEGER(0..10),
    timeDomainOCC            INTEGER(0..6)
}
```

Figure 5A:
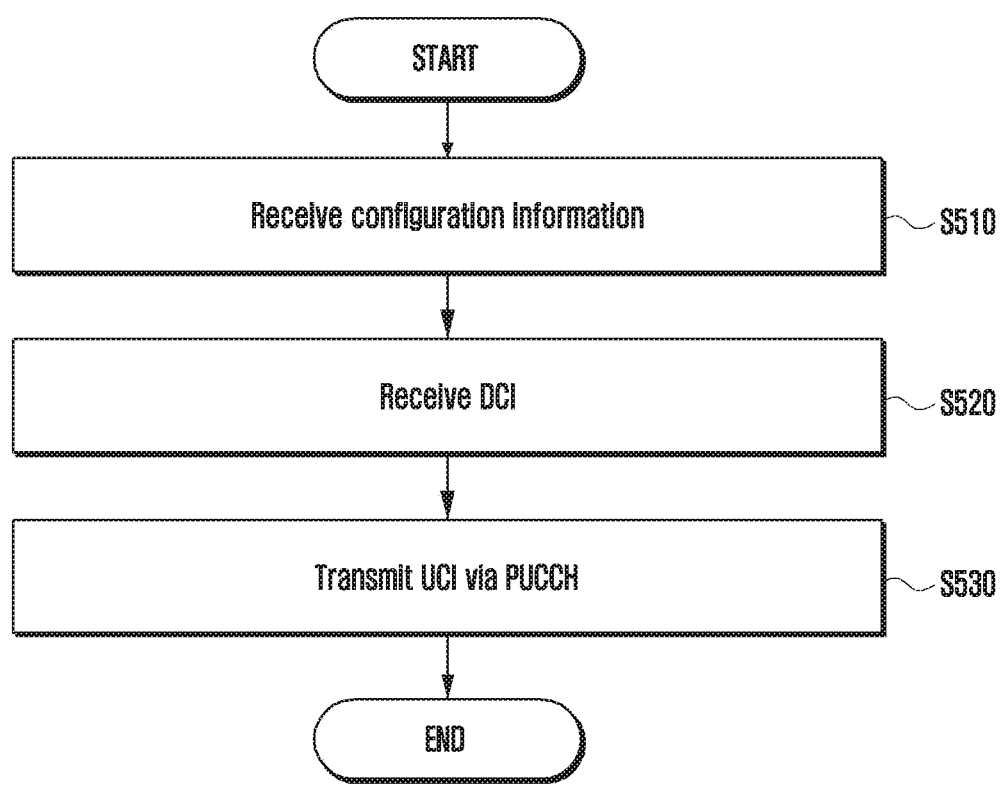
FIG. 5A a diagram illustrating a method for repeatedly transmitting a PUCCH according to an embodiment of the disclosure.

FIG. 5A a diagram illustrating a method for repeatedly transmitting a PUCCH according to an embodiment of the disclosure.

Referring to FIG. 5A, after accessing a base station, a terminal may receive configuration information in operation S510. The configuration information is information for data transmission/reception with the base station, and may be received via a higher signal. Information configured via the higher signal may include information on a time and frequency resource to which a PDSCH is allocated, an MCS table number, and information on a format, time, and frequency resource in which a PUCCH is transmitted.

The terminal may receive control information (DCI) in operation S520. If the PDSCH is scheduled based on DCI, the terminal may receive data via the PDSCH.

The terminal may transmit uplink control information via the PUCCH in operation S530. If the terminal receives data via the PDSCH, the uplink control information may include HARQ-ACK information indicating whether decoding of the data is successful or failed. The uplink control information may include an SR, channel quality indicator (CQI), and the like.

The terminal may repeatedly transmit the same control information via the PUCCH. The PUCCH may include consecutive symbols.

The PUCCH resource may be determined based on the received configuration information and downlink control information. For example, if HARQ-ACK is transmitted, the HARQ-ACK information may be transmitted in a slot indicated by a PDSCH-to-HARQ feedback timing indicator included in DCI for scheduling the PDSCH. Values mapped to respective PDSCH-to-HARQ feedback timing indicators of 1 to 3 bits are configured via higher layer signals as shown in Table 7. If the PDSCH-to-HARQ feedback timing indicator indicates k, the terminal transmits HARQ-ACK information after k slots in slot n, in which data has been transmitted via the PDSCH, that is, in slot n+k.

TABLE 7

| PDSCH-to-HARQ_feedback timing indicator | | | |
|---|---|---|---|
| 1 bit | 2 bits | 3 bits | Number of slots $k$ |
| "0" | "00" | "000" | $1^{st}$ value provided by dl-DataToUL-ACK |
| "1" | "01" | "001" | $2^{nd}$ value provided by dl-DataToUL-ACK |
|  | "10" | "010" | $3^{rd}$ value provided by dl-DataToUL-ACK |
|  | "11" | "011" | $4^{th}$ value provided by dl-DataToUL-ACK |
|  |  | "100" | $5^{th}$ value provided by dl-DataToUL-ACK |
|  |  | "101" | $6^{th}$ value provided by dl-DataToUL-ACK |
|  |  | "110" | $7^{th}$ value provided by dl-DataToUL-ACK |
|  |  | "111" | $8^{th}$ value provided by dl-DataToUL-ACK |

If the PDSCH-to-HARQ feedback timing indicator is not included in DCI (e.g., DCI format 1_1) for scheduling of the PDSCH, the terminal transmits HARQ-ACK information in slot n+k according to value k configured based on higher layer signaling. When the terminal transmits the HARQ-ACK information, the terminal may use a PUCCH resource determined based on a PUCCH resource indicator included in DCI for scheduling of the PDSCH. Here, an ID of the PUCCH resource mapped to the PUCCH resource indicator may be configured via higher layer signaling.

The above description is merely an example, and value k may be an OFDM symbol group unit or an OFDM symbol, which is not a slot. The PUCCH resource in which HARQ-ACK information is transmitted may be determined by, for example, a PUCCH resource indicator including 3 bits in DCI format 1_1, as shown in Table 8 below.

TABLE 8

| PUCCH resource indicator | PUCCH resourcePUCCH resource indicator |
|---|---|
| "000" | $1^{st}$ PUCCH resource provided by pucch-ResourceId obtained from the $1^{st}$ value of resourceList |
| "001" | $2^{nd}$ PUCCH resource provided by pucch-ResourceId obtained from the $2^{nd}$ value of resourceList |
| "010" | $3^{rd}$ PUCCH resource provided by pucch-ResourceId obtained from the $3^{rd}$ value of resourceList |
| "011" | $4^{th}$ PUCCH resource provided by pucch-ResourceId obtained from the $4^{th}$ value of resourceList |
| "100" | $5^{th}$ PUCCH resource provided by pucch-ResourceId obtained from the $5^{th}$ value of resourceList |
| "101" | $6^{th}$ PUCCH resource provided by pucch-ResourceId obtained from the $6^{th}$ value of resourceList |
| "110" | $7^{th}$ PUCCH resource provided by pucch-ResourceId obtained from the $7^{th}$ value of resourceList |
| "111" | $8^{th}$ PUCCH resource provided by pucch-ResourceId obtained from the $8^{th}$ value of resourceList |

A field value of the PUCCH resource indicator is mapped to one value in one PUCCH resource set configured by resourceList via a higher signal in a situation where multiple PUCCH resource sets are configured.

However, the scope of rights of the disclosure is not limited to this, and a method of configuring a PUCCH resource by using only configuration information or DCI is also possible.

The method of a terminal according to FIG. 5A includes: receiving configuration information including PUCCH resource information; receiving downlink control information; and repeatedly transmitting identical uplink control information in a PUCCH resource including consecutive symbols, which is determined based on the downlink control information and the configuration information.

A detailed description of the method for repeatedly transmitting the PUCCH will be described below with reference to FIG. 5B.

Figure 5B:
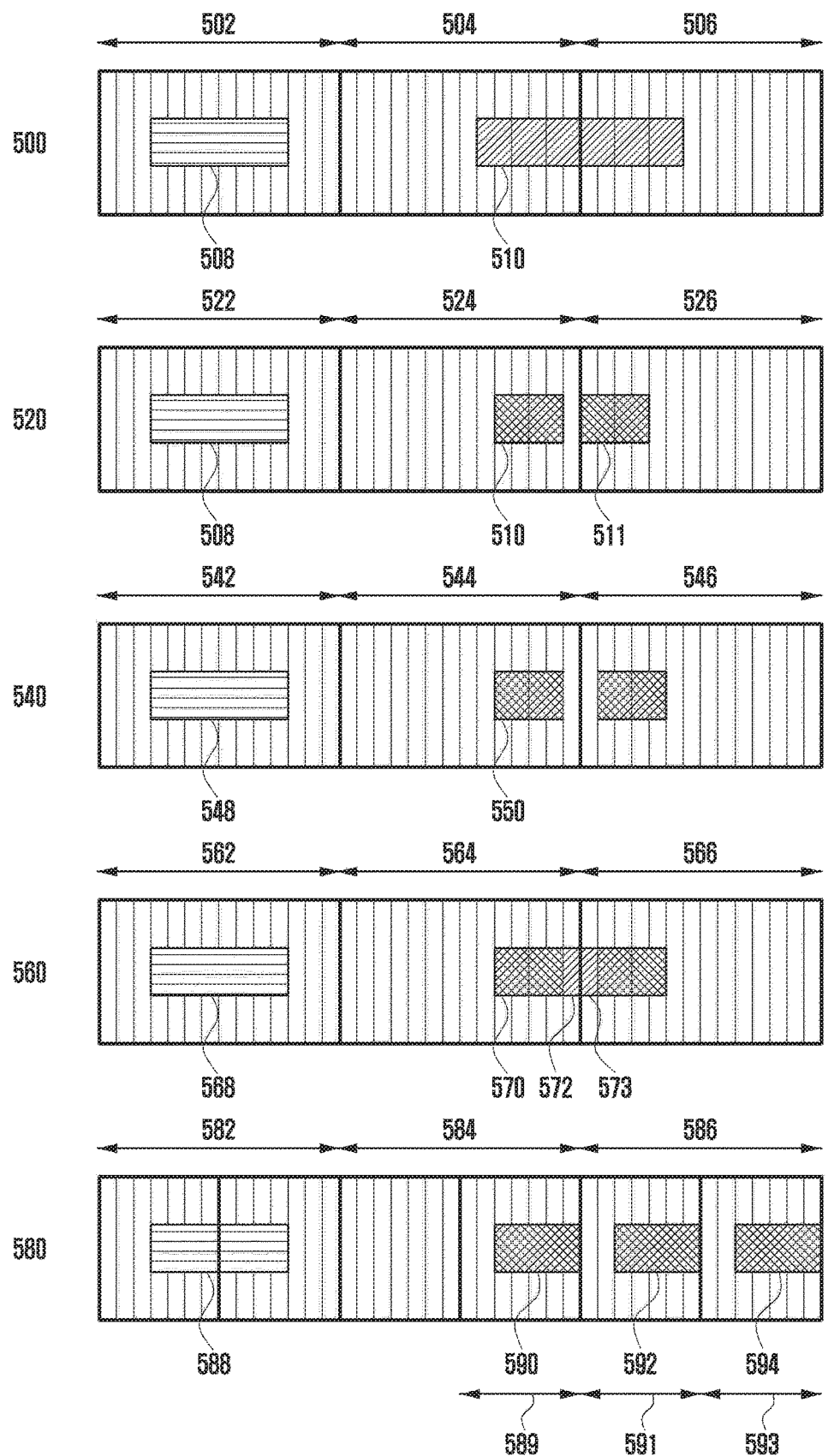
FIG. 5B is a diagram illustrating a method for repeatedly transmitting a PUCCH according to an embodiment of the disclosure.

FIG. 5B is a diagram illustrating a method for repeatedly transmitting a PUCCH according to an embodiment of the disclosure.

Referring to FIG. 5B, reference numeral 500 shows a situation in which a terminal receives, in slot 502, a PDSCH 508 scheduled based on downlink control information received from a base station, and transmits a PUCCH 510 including HARQ-ACK information relating thereto in slot 504 to slot 506.

The uplink control information includes information for scheduling of the PDSCH 508 and information for scheduling of the PUCCH including HARQ-ACK information. The terminal may repeatedly transmit the PUCCH including HARQ-ACK information for the PDSCH 508.

For example, the terminal may receive information on PUCCH repetitive transmission, via a higher signal. Information on repetitive transmission may include the number of repetitive transmissions. For example, for the information on the PUCCH repetitive transmission, a plurality of sets may be configured via a higher signal, and one of the sets may be indicated via DCI. Alternatively, the information on PUCCH repetitive transmission may be configured via DCI.

Therefore, the terminal having received the information on repetitive transmission may repeatedly transmit the PUCCH a configured number of times.

If a point in time when the terminal receives the PDSCH and then transmits the PUCCH including HARQ-ACK information via demodulation/decoding is symbols positioned in a second half in one slot, the terminal may have to transmit the PUCCH via two slots over a slot boundary. However, it is impossible for the terminal to transmit the PUCCH over the slot boundary. Therefore, the terminal may allocate a PUCCH having a short symbol length, or may allocate a PUCCH having a longer symbol length in a subsequent slot. However, in the case of URLLC requiring an ultra-low delay and high reliability, since reliability of data transmission may be further improved via PUCCH transmission including fast and accurate HARQ-ACK information, the terminal may have to perform, in a short time, PUCCH transmission including HARQ-ACK information that is a result of decoding the PDSCH scheduled based on DCI, and more time resources may also be required for higher reliability.

Therefore, a method of transmitting one PUCCH 510 multiple times, as shown in reference numeral 500 of feature 5B, may be one of methods for solving the above-described problem. For example, it may be an example showing that PUCCH transmission with 12 symbol lengths may be started at any time regardless of slot boundaries. In addition, for another purpose of PUCCH repetitive transmission, when the terminal has a connection with a plurality of base stations, the terminal may be able to apply PUCCH repetitive transmission to an operation capable of forming beams and transmitting the beams to different base stations, respectively, for each PUCCH transmission. The method for performing PUCCH repetitive transmission and various embodiments thereof are described below.

Method 1-1: PUCCH transmission start symbol, length, and number of repetitive transmissions According to method 1-1, a PUCCH transmission start symbol, length, and the number or repetitive transmissions of PUCCH may be configured for a terminal, and accordingly the PUCCH may be transmitted in consecutive symbols.

In the case of method 1_1, PUCCH resource configuration information is configured via a higher signal, and information on a specific PUCCH resource may be indicated via DCI. For information on each specific PUCCH resource, a start symbol at which a PUCCH is transmitted, a length, a frequency start position, a PUCCH format, the number of repetitive transmissions, and the like may be included.

For example, information on the PUCCH resource scheduled based on DCI in reference numeral 500 of FIG. 5B shows a situation in which the PUCCH starts at a 9th symbol, has a length of 2, and includes information indicating a total of 6 repetitive transmissions (an initial transmission and 5 identical repetitive transmissions).

Additionally, in the case of frequency hopping, inter-slot hopping and PUCCH transmission-specific hopping may exist. In the case of inter-slot hopping, if repeatedly transmitted PUCCHs are in the same slot, the PUCCHs may be positioned in the same frequency resource, and if the PUCCHs are positioned in different slots, the PUCCHs may be positioned in different frequency resources. For example, it may be possible that starting RBs of PUCCHs repeatedly transmitted in slot 504 are 4, and starting RBs of PUCCHs repeatedly transmitted in slot 506 are 10.

In the case of PUCCH transmission-specific hopping, PUCCHs transmitted in an odd-numbered and PUCCHs transmitted in an even-numbered may have different starting RBs.

The described number of repetitive transmissions shows a situation in which the number of repetitive transmissions is configured by being bundled with a higher signal like other PUCCH transmission resource information. However, as another example, it may also be possible that the number of repetitive transmissions is indicated directly based on DCI. For example, the number of repetitive transmissions may be indicated by an indicator indicating a number of repetitions designed in the form of dynamic indication. Alternatively, the number of repetitive transmissions is configured via a higher signal, but one value may be configured so that the value is commonly applied to PUCCH transmission resources, without the number of repetitive transmissions being configured specifically to each information on the PUCCH transmission resource.

As another example, dynamic indication indicative of the repetitive transmission may be classified to a 1-bit type that is enabled/disabled in DCI information or classified to a separate specific DCI format.

Alternatively, a field indicating the number of PUCCH repetitive transmissions may be present in the DCI format separately from the PUCCH resource allocation information (used interchangeably with the term PUCCH resource information) according to a higher signal configuration. For the DCI format, a PUCCH format associated with downlink data to be allocated or HARQ-ACK transmission corresponding thereto may be allocated. In the described classification for each DCI format, specifically, PUCCH resource allocation indicator information indicated for each DCI format may be differently interpreted, and for example, even if PUCCH resource allocation information indicated in DCI format 1_0 and PUCCH resource allocation information indicated in DCI format 0_0 have the same bit information, the PUCCH format or the number of PUCCH repetitive transmissions may be the same or different due to different higher signal configurations.

Method 1-2: Start symbol and length for each PUCCH repetitive transmission

Unlike method 1-1, method 1-2 is a method of notifying a start symbol and a length for each PUCCH repetitive transmission, instead of directly notifying the number of PUCCH repetitive transmissions. For example, in reference numeral 500 of FIG. 5B, PUCCH transmission resource configuration information included in DCI information transmitted by the base station may be configured as {(start symbol, length), . . . ,}={(9,10), (11,12), (11,14), (1,2), (3,4), (5,6)}. Alternatively, the information may be received based on configuration information via a higher layer. Here, the number of sets indicated by curly brackets refers to the number of actual PUCCH repetitive transmissions. Further, the sets are sequentially mapped to each other in terms of time. Therefore, the terminal may implicitly determine that (1, 2) is not a slot, in which the PUCCH is repeatedly transmitted for the first time, and is a slot which follows thereafter. Alternatively, it may be possible to add information indicating a slot thereafter via configuration information of a separate higher layer. For example, instead of (1,2), n1 may be configured as a value indicating a slot subsequent to the slot in which the PUCCH is repeatedly transmitted, in the same manner as (n1+1, n1+2). Hopping may be applicable in the same manner as method 1-1.

Method 1-3: Start position for PUCCH repetitive transmission

In method 1-1, the start time point of the PUCCH resource may be determined for each PUCCH resource information, so that the start time point pf the PUCCH resource may be checked by indicating PUCCH resource information via DCI. In method 1-2, the PUCCH resource may be indicated via a resource set for repetitive transmission, by separately combining start positions and lengths via RRC or DCI.

Unlike the above method, method 1-3 is a method of indicating a start symbol of PUCCH repetitive transmission based on time length information from a point in time when the PDSCH is received to a symbol at which the PUCCH resource starts.

According to various embodiments of the disclosure, at least a start symbol of the PDSCH, a last symbol of the PDSCH, a symbol subsequent to the last symbol of the PDSCH, and the like, may be considered for the point in time when the PDSCH is received. The time length may include at least the number of symbol units, the number of symbol group (sub-slot) units, or the number of a slot unit. For example, as shown in FIG. 5B, the terminal having received and successfully decoded the PDSCH resource may determine that a PUCCH repetitive transmission resource is allocated from a symbol that is 11 symbols away from the last symbol of the PDSCH. Descriptions of the number of repetitive transmissions and a symbol length other than the method for indicating a start symbol may be applied in the same manner as described in methods 1-1 and 1-2.

As another example, if a part of the repeatedly transmitted PUCCH transmission resource is indicated as a downlink symbol by a semi-statically (via a high level signal) indicated slot format indicator, the terminal considers that corresponding PUCCH repetitive transmission is delayed to subsequent transmission. Specifically, in a situation where a PUCCH repetitive transmission having a length of 3 symbols is repeatedly performed 4 times, if a part of the PUCCH resource, which is repeatedly transmitted a second time, is indicated as the downlink symbol by the semi-statically indicated slot format indicator, the terminal delays a second repeatedly transmitted PUCCH resource to subsequent transmission and transmits the same, and the terminal performs a total of 4 repetitive transmissions. If a part of the repeatedly transmitted PUCCH transmission resource is indicated as the downlink symbol by a dynamically indicated (via signal L1) slot format indicator, corresponding PUCCH transmission may be canceled. Specifically, in a situation where the PUCCH repetitive transmission having a length of 3 symbols is repeatedly performed 4 times, if a part of the PUCCH resource, which is repeatedly transmitted a second time, is indicated as the downlink symbol by the semi-statically indicated slot format indicator, even if the terminal is indicated to drop a second repeatedly transmitted PUCCH resource and transmit scheduling repeatedly 4 times, the terminal performs repetitive transmission only 3 times. In a situation where the terminal periodically monitors a dynamic slot format indicator, if the terminal is unable to detect the slot format indicator, the terminal does not perform PUCCH transmission in a resource indicated as a semi-statically flexible symbol. Specifically, in a situation where the PUCCH repetitive transmission having a length of 3 symbols is repeatedly performed 4 times, if a part of the PUCCH resource, which is repeatedly transmitted a second time, is indicated as a semi-statically flexible symbol while it has failed to receive dynamic slot format indicator information, even if the terminal is indicated to drop a second repeatedly transmitted PUCCH resource and transmit scheduling repeatedly 4 times, the terminal performs repetitive transmission only 3 times. The symbol length of 3 in the above embodiment is only an example and does not limit a corresponding value.

As another example, the terminal may be able to perform PUCCH repetitive transmission using the concept of a sub-slot that is smaller than a slot, for PUCCH repetitive transmission. The sub-slot is a unit smaller than a slot including 14 OFDM symbols and may have a value from 1 to 13 OFDM symbols. One or more sub-slots may exist in one slot, and the number of OFDM symbols included in each of the sub-slots may be the same or different. For example, if the number of OFDM symbols in a sub-slot is 2, 7 sub-slots may be included in one slot, and if the number of OFDM symbols in a sub-slot is 7, 2 sub-slots may be included in one slot. If the number of OFDM symbols included in the sub-slots is different, there will be a maximum of one OFDM symbol difference. For example, one slot may include 4 sub-slots in which the number of OFDM symbols is (3, 4, 3, 4).

The sub-slot may be a basic unit of transmission and operation, similar to the slot. For each sub-slot, up to only one PUCCH including HARQ-ACK information can be transmitted. UCI multiplexing and HARQ-ACK codebook construction that operate for each slot may operate in units of sub-slots. In order to operate in the sub-slot, a higher signal is configured for the terminal in advance from the base station. Specifically, the unit of the PDSCH-to-HARQ_feedback timing indicator included in DCI format 1_0 or 1_1 is a slot unit in Rel-15 NR. However, for enhanced PUCCH transmission, in a subsequent release, the unit of the PDSCH-to-HARQ_feedback timing indicator may be configured to be a slot or a sub-slot via a higher signal. If the unit of the PDSCH-to-HARQ_feedback timing indicator is configured to be a sub-slot, a value of the PDSCH-to-HARQ-_feedback timing indicator refers to the number of sub-slots, and specifically, the value refers to a difference value between a sub-slot including a termination symbol of PDSCH and a sub-slot of a start symbol at which PUCCH transmission starts. Further, the value of the PDSCH-to-HARQ_feedback timing indicator is determined based on spacing of a subcarrier via which the PUCCH or PUSCH is transmitted. If a starting symbol index among PUCCH resource information values indicated by the PUCCH resource indicator of the same DCI format 1_0 or 1_1 is configured in units of subslots, the value of the PDSCH-to-HARQ_feedback timing indicator is a value calculated based on a boundary value of the sub-slot including a corresponding PUCCH transmission start symbol. As another example, sub-slot-based PUCCH repetitive transmission may be possible in addition to the method described in FIG. 5B. This is referred to as disclosure 1-4.

Method 1-4: In Rel-15 NR, PUCCH repetitive transmission is configured based on a slot unit, as described above in FIG. 4. For example, a PUCCH transmitted in one slot has been repeatedly transmitted in the form having the same start symbol position and length within a subsequent slot. Similarly, also in the sub-slot-based PUCCH repetitive transmission, it may be possible for a PUCCH resource to be repeatedly transmitted in the form having the same start symbol and length based on a sub-slot in a sub-slot structure previously configured via a higher signal. Specifically, in FIG. 5B, reference numeral 580 shows a situation where the PUCCH is transmitted once for each sub-slot in a sub-slot unit form having a length of 7 symbols, and the transmission is repeatedly performed a total of three times 590, 592, and 594. With respect to PDSCH 588 received in slot 582, for the terminal, an HARQ_feedback timing indicator having a sub-slot unit indicates 2, which means that the PUCCH is transmitted from a latter sub-slot among two sub-slots in slots 584 and 586. In PUCCH resource value information indicated by the PUCCH resource indicator, if a starting symbol index is 2 and a symbol length is indicated to be 5, and if the number of PUCCH repetitive transmissions is provided as 3 via a higher signal and signal L1, the terminal starts from a third symbol with respect to sub-slots 589, 591, and 593 having a symbol length of 7, and determines to perform PUCCH repetitive transmission having a length of 5. It may be possible that a sub-slot-related configuration is performed in a cell unit, in a CC unit, in a BWP unit, in a DCI format unit, in a CORESET unit, in a search space unit, or in an RNTI unit.

Reference numeral 500 of FIG. 5B shows a situation in which PUCCH repetitive transmission starts from a 9th symbol in slot 504 and the PUCCH having 2 symbol length is repeatedly transmitted 5 times. However, if, as shown in reference numeral 520, scheduling is received such that PUCCH repetitive transmission starts from a 10th symbol in slot 524 and the PUCCH having 2 symbol length is transmitted a total of 5 times, a situation, in which a third PUCCH transmission is performed over a slot boundary, may occur. Therefore, a method for resolving such a situation is required, and specific details will be described below. Reference numeral 520 shows a situation in which a terminal receives, in slot 522, a PDSCH 508 scheduled based on downlink control information received from a base station, and transmits a PUCCH 510 including HARQ-ACK information relating thereto in slot 524 to slot 526.

Method 2-1: Method 2-1 is a method of dropping control information to be transmitted in a PUCCH resource part including a slot boundary, and then transmitting the control information at a start symbol of a slot. Dropped information may not be transmitted or may be transmitted in a resource subsequent to an allocated PUCCH resource.

According to method 2-1, as shown in reference numeral 520, the terminal may determine that a third transmission is not valid and may transmit a fourth PUCCH to be transmitted at a valid uplink symbol 511 that starts first based on the slot boundary. Alternatively, if a drop is assumed for the third transmission, but repetitive transmission is based on an actual transmission rather than scheduling, in reference numeral 520 of FIG. 5B, the terminal may repeatedly transmit the PUCCH 510 having a length of 2 symbols 4 times, as shown in the above, except for the slot boundary part, and then may transmit the PUCCH 510 one more time at symbol 2, so that repetitive transmission can be performed 5 times.

Method 2-2: Method 2-2 is a method of dropping control information to be transmitted in a PUCCH resource part including a slot boundary, emptying the PUCCH resource part, and transmitting the control information. Dropped information may not be transmitted or may be transmitted in a resource subsequent to allocated PUCCH resources.

According to method 2-2, the terminal may determine that a third transmission is not valid, as shown in reference numeral 540, and may perform the remaining PUCCH repetitive transmissions, as previously configured. This method is different from method 2-1 in that the PUCCH is not transmitted at a first, symbol of the slot. Reference numeral 540 shows a situation in which a terminal receives, in slot 542, a PDSCH 548 scheduled based on downlink control information received from a base station, and transmits a PUCCH 550 including HARQ-ACK information relating thereto in slot 544 to slot 546. Alternatively, if a drop is assumed for the third transmission, but the repetitive transmissions of 5 times are based on an actual transmission rather than scheduling, in reference numeral 540 of FIG. 5B, the terminal may repeatedly transmit the PUCCH 550 having a length of 2 symbols 4 times, as shown in the above, except for the slot boundary part, and then may transmit the PUCCH 510 one more time at symbol 2, so that repetitive transmission can be performed 5 times.

Method 2-3: Method 2-3 is a method of transmitting control information by segmenting a PUCCH resource part including a slot boundary based on the slot boundary. The control information may be transmitted only in a part of the segmented PUCCH resource part, or the control information may be transmitted in each of all the segmented PUCCH resources.

According to method 2-3, as shown in reference numeral 560, the third repetitive transmission may be segmented into two different PUCCH transmissions 572 and 573 by the slot boundary and transmitted individually. Reference numeral 560 shows a situation in which a terminal receives, in slot 562, a PDSCH 566 scheduled based on downlink control information received from a base station, and transmits PUCCH 570, 572, or 573 including HARQ-ACK information relating thereto in slot 564 to slot 566. Alternatively, if one PUCCH transmission time resource is segmented into two or more PUCCH transmissions by the slot boundary or DL/UL switching, it may be possible to drop a corresponding PUCCH transmission according to a symbol length of the segmented PUCCH transmission. For example, in a situation where the PUCCH repetitive transmission is performed in the form of PUCCH formats 1, 3, and 4 that support a length of 4 symbols or more, if a time resource of a specific PUCCH among PUCCHs segmented by the slot boundary has a length of less than 4 symbols, the terminal may be able to drop the segmented PUCCH transmission. Alternatively, instead of dropping the segmented PUCCH transmission, the terminal may transmit UCI via the PUCCH by using PUCCH formats 0 and 2 supporting PUCCH transmission of 2 symbols or less.

Alternatively, the terminal may perform only one PUCCH 570 or 572 transmission for the segmented PUCCH.

In the case of frequency hopping, intra-slot hopping and inter-slot hopping exist in the NR or 5G system, wherein the intra-slot hopping means that, if the PUCCH is scheduled in one slot, a PUCCH transmission interval is divided into two so that the PUCCH is transmitted in different frequency bands. In general, if a PUCCH transmission length is N, the length includes two PUCCHs having lengths of a ceiling (N/2) and a floor (N/2), and the frequency band is determined by a size of a BWP configured for the terminal and a start frequency value configured in advance via a higher signal.

Inter-slot hopping means that hopping is applied to each slot if one PUCCH is repeatedly transmitted over multiple slots. For example, inter-slot hopping means that the PUCCH is repeatedly transmitted in different frequency bands at each slot. Specifically, PUCCHs transmitted in even-numbered slots have the same frequency band. Similarly, PUCCHs transmitted in odd-numbered slots have the same frequency band. Here, the length of PUCCH transmission for each slot is the same.

At PUCCH repetitive transmissions proposed in FIG. 5A and FIG. 5B, PUCCH hopping may be applied to each PUCCH transmission interval separately from the intra-slot hopping or inter-slot hopping described above. For example, if PUCCH repetitive transmission occurs a total of 4 times, the transmission frequency band may be determined according to a point in time when the PUCCH repetitive transmission is performed.

For example, if PUCCH i (i=1, 2, 3, 4) is repeatedly transmitted, PUCCH 1 and PUCCH 3 may be transmitted in the same frequency band and PUCCH 2 and PUCCH 4 may be transmitted in the same frequency band. PUCCH 1 and PUCCH 2 may be determined as different values according to a frequency value configured via a higher signal and a BWP bandwidth size. Even if one PUCCH transmission among PUCCH repetitive transmissions is scheduled based on a specific situation (downlink symbol allocation or scheduling over the slot boundary), if actual transmission is canceled, it may be possible for a value i to have different definitions. Therefore, i may refer to a point in time (occasion) when the terminal actually transmits the PUCCH or a point in time (occasion) when the PUCCH is scheduled for the terminal.

If the frequency hopping of inter mini-slot repetition according to the method described above with reference to FIG. 5A and FIG. 5B is not enabled by a higher signal, terminal transmission is as follows. Based on an antenna port used for uplink transmission, a channel of a specific symbol may be inferred from a channel of another symbol in the same slot. If frequency hopping for inter mini-slot repetition is enabled by a higher signal, terminal transmission is as follows. Based on the antenna port used for uplink transmission, a channel of a specific symbol may be inferred from a channel of another symbol in the same mini-slot transmission.

An intra mini-slot hopping scheme may be applied only to PUCCH formats 1, 3, and 4 with a length of 4 or longer, or the terminal may consider that intra mini-slot hopping is disabled in a situation where mini-slot repetition is applied. Inter mini-slot repetition may be applicable to all PUCCH formats 0, 1, 2, 3, and 4, or may be applicable to only a part of PUCCH formats.

The following method is applied to group and sequence hopping.

In the above-described method, nominal repetition is defined to be the number of scheduled PUCCH repetitive transmissions. For example, in reference numeral 560 of FIG. 5B, the number of nominal repetitions of PUCCH repetition 570 is 5. On the other hand, the definition of actual repetition includes that PUCCH repetition scheduled by DL/UL switching or an actual slot boundary is segmented and repeatedly transmitted. For example, in reference numeral 560 of FIG. 5B, the PUCCH repetition 570 includes specific PUCCH transmissions 572 and 573 segmented by a slot boundary, wherein the number of actual repetitions is 6. Only one of the various frequency hopping methods described above may be used when actual PUCCH repetitive transmission is performed.

Figure 6A:
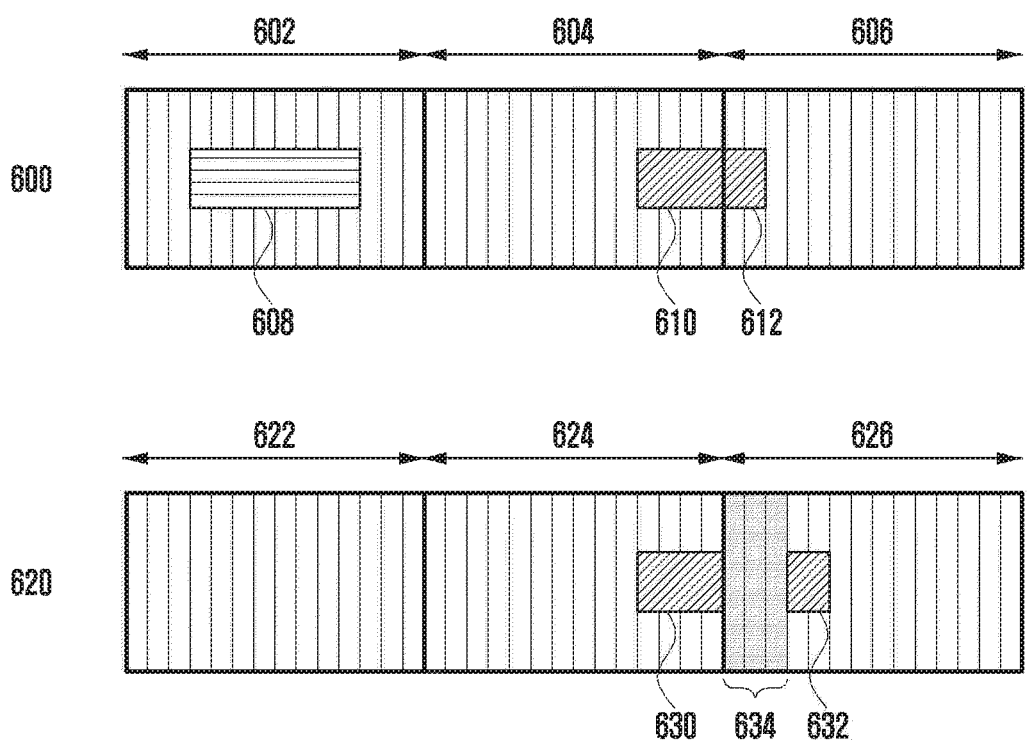
FIG. 6A is a diagram illustrating a method for repeatedly transmitting a PUCCH according to an embodiment of the disclosure.

FIG. 6A is a diagram illustrating a method for repeatedly transmitting a PUCCH according to an embodiment of the disclosure.

Figure 6B:
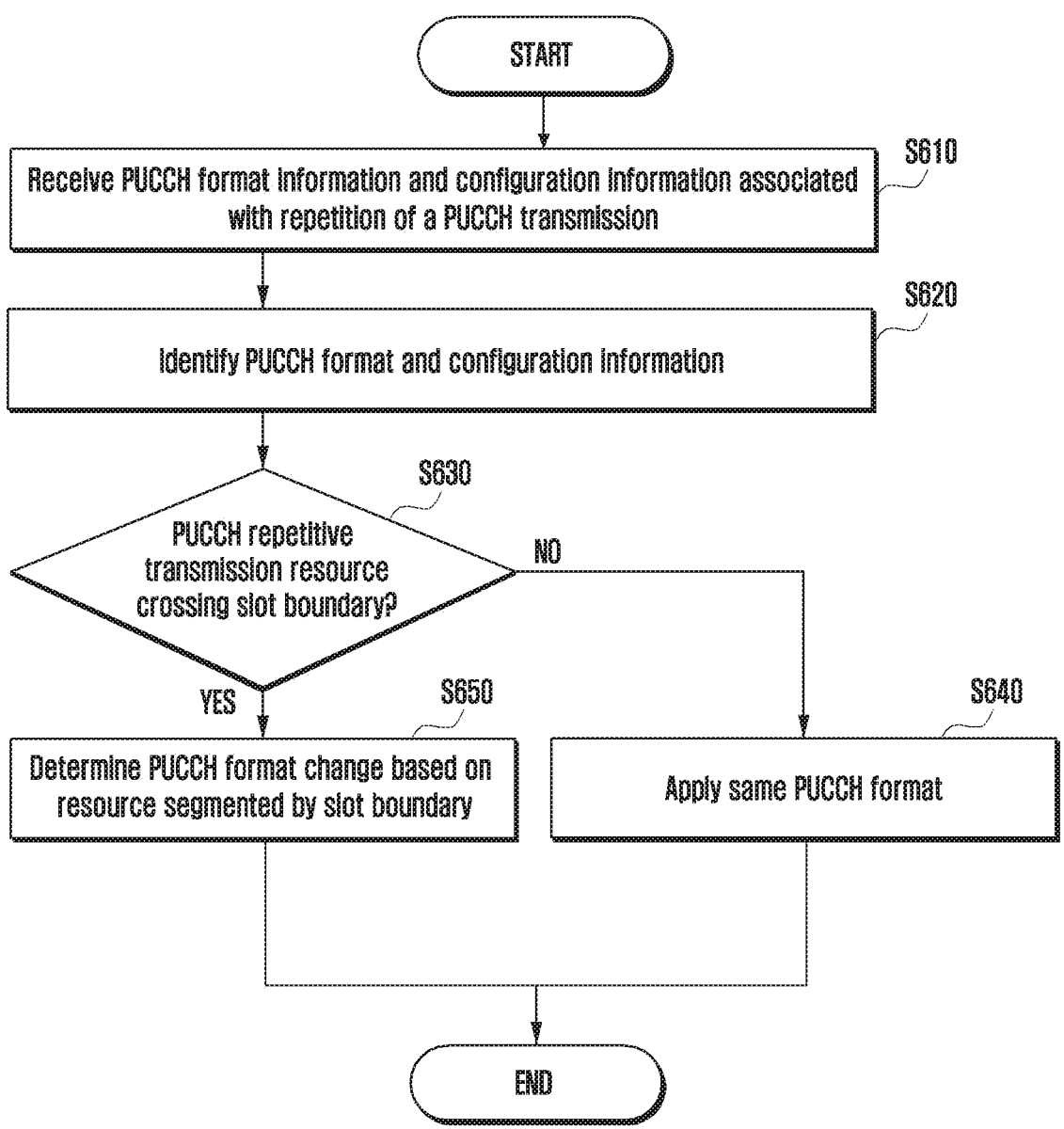
FIG. 6B is a diagram illustrating a method for repeatedly transmitting a PUCCH according to an embodiment of the disclosure.

FIGS. 5A and 5B describe a method for repetitive transmission, by a terminal, using a PUCCH transmission resource having the same symbol length for PUCCH transmission across a slot boundary. Here, the PUCCH transmission may be performed in consecutive symbols. In FIG. 6A and FIG. 6B, one PUCCH transmission resource is allocated for PUCCH transmission over a slot boundary, and if the PUCCH transmission resource crosses the slot boundary, the PUCCH transmission resource may be segmented based on the slot boundary. Accordingly, a symbol length of a first PUCCH transmission resource before the slot boundary and a symbol length of a second PUCCH transmission resource after the slot boundary may be determined, and the terminal may repeatedly transmit the PUCCH in the first PUCCH transmission resource and the second PUCCH transmission resource. A basic PUCCH format group to be transmitted by

TABLE 9

The sequence group $u = (f_{gh} + f_{ss})$ mod 30 and the sequence number v within the group depends on the higher-layer parameter pucch-GroupHopping: -   if pucch-GroupHopping equals 'neither'
$f_{gh} = 0$
$f_{ss} = n_{ID}$ mod30
  $v = 0$
    where $n_{ID}$ is given by the higher-layer parameter hoppingId if configured, otherwise $n_{ID} = n^{cell}_{ID}$.
  - if pucch-GroupHopping equals 'enable'
$f_{gh} = (\Sigma^{7}_{m=0} 2^m c(8(2n^{\mu}_{s,f} + n_{hop}) + m))$mod30
  $f_{ss} = n_{ID}$ mod 30
  $v = 0$
    where the pseudo-random sequence c(i) is defined by clause 5.2.1 and shall be initialized at the beginning of each radio frame with $c_{init} = \lfloor n_{ID}/30 \rfloor$ where $n_{ID}$ is given by the higher-layer parameter hoppingId if configured, otherwise $n_{ID} = n^{cell}_{ID}$.
  - if pucch-GroupHopping equals 'disable'
$f_{gh} = 0$
  $f_{ss} = n_{ID}$ mod30
    $v = c(2n^{\mu}_{s,f} + n_{hop})$
      where the pseudo-random sequence c(i) is defined by clause 5.2.1 and shall be initialized at the beginning of each radio frame with $c_{init} = 2^5 \lfloor n_{ID}/30 \rfloor +$ ($n_{ID}$ mod 30) where $n_{ID}$ is given by the higher-layer parameter hoppingId if configured, otherwise $n_{ID} = n^{cell}_{ID}$.
The frequency hopping index $n_{hop} = 0$ if intra-slot frequency hopping is disabled by the higher-layer parameter intraSlotFrequencyHopping. If frequency hopping is enabled by the higher-layer parameter intraSlotFrequencyHopping, $n_{hop} = 0$ for the first hop and $n_{hop} = 1$ for the second hop.
  If mini-slot frequency hopping is disabled by the higher-layer signaling, frequency hopping index $n_{hop} = 0$. If mini-slot frequency hopping is enabled by the higher-layer signaling, frequency hopping index $n_{hop} = 0$ for the even$_{hop}$ and $n_{hop} = 1$ for the odd hop when each hop number is determined by actual PUCCH repetitions or nominal PUCCH repetitions.
    Or,
  If mini-slot frequency hopping is disabled by the higher-layer signaling, frequency hopping index $n_{hop} = 0$. If mini-slot frequency hopping is enabled by the higher-layer signaling, frequency hopping index $n_{hop} = n$ where n is hop index that is determined by actual repetitions or nominal repetitions and hop index starts at 0.

the terminal is also determined by the determined symbol lengths. For example, a PUCCH format supporting 1 to 2 symbols or a PUCCH format supporting 4 to 14 symbols may be determined according to the length of the segmented PUCCH transmission resource. Details will be described below.

Referring to reference numeral 600 of FIG. 6A, if a PUCCH resource 608 having a length of 8 symbols is allocated from a fourth symbol of slot 602, the terminal may transmit control information including HARQ-ACK, an SR, or CSI report information to a base station in a corresponding transmission resource. PUCCH resources described in FIG. 6A are determined based on DL DCI for scheduling of a PDSCH to a resource corresponding to the PDSCH. Alternatively, the described PUCCH resources are determined based on UL DCI or DL DCI indicating UL configured type 2 or SPS PDSCH release.

If a PUCCH resource having a length of 6 symbols is allocated from a 10th symbol of slots 604 and 606, the PUCCH resource crosses a slot boundary so that the PUCCH resource may be segmented into a PUCCH resource 610 having a length of 4 symbols before the slot boundary and a PUCCH resource 612 having a length of 2 symbols after the slot boundary, as described above. Therefore, the terminal may repeatedly transmit control information via the PUCCH resources 610 and 612.

Here, the first PUCCH resource 610 has a length of 4 symbols, and therefore at least one of PUCCH formats 1, 3, and 4 may be applied. The second PUCCH resource 612 has a length of 2 symbols, and therefore at least one of PUCCH formats 0 or 2 may be applied.

Therefore, the control information is transmitted via the first PUCCH resource 610 and the second PUCCH resource 612 in different PUCCH formats, but identical control information may be repeatedly transmitted via two PUCCH resources.

The PUCCH transmission resource over the slot boundary may be configured via a higher signal so that a starting symbol index and a symbol length among PUCCH transmission resource parameters indicated by a PUCCH resource indicator included in the control information received by the terminal cross the slot boundary.

For example, in reference numeral 600 of FIG. 6A, if the PUCCH resource indicator indicated via the control information indicates specific PUCCH resource information, a starting symbol index associated with corresponding information is 9, and a symbol length is 6, the terminal may expect transmission to be performed in the form of the PUCCH resource 610 and PUCCH resource 612. Alternatively, the base station may be able to indicate the starting symbol index and symbol length values themselves via different control information fields. Alternatively, as described in FIG. 1, by using a starting and length indication value (SLIV) simultaneously indicating a starting symbol index and a symbol length, which corresponds to a method for allocating a PUSCH time resource region, it is also possible to provide a single value for the start symbol and length of the PUCCH to the terminal via a higher signal or signal L1.

In reference numeral 600 of FIG. 6A, only a situation, in which PUCCHs having different lengths and different PUCCH formats are repeatedly transmitted, is described, but PUCCHs having the same length but different PUCCH formats may also be repeatedly transmitted. Alternatively, it is also possible to repeatedly transmit PUCCHs having the same PUCCH format but different lengths. As another example, the terminal may determine, via the control information, a time axis position of the PUCCH resource for repetitive transmission, based on a symbol length value and a distance from a last symbol of the PDSCH to a start symbol of the PUCCH resource. The last symbol of the PDSCH may refer to a last symbol among symbols, at which the PDSCH has been transmitted, or a subsequent first symbol immediately after the PDSCH has been transmitted.

Reference numeral 620 of FIG. 6A shows a situation in which at least one symbol 634 in the front part of a slot after a slot boundary is a downlink interval in a situation where the PUCCH transmission interval crosses the slot boundary. Here, a length of the downlink interval may be allocated by a length of the PDCCH symbol or a PDSCH symbol scheduled by the base station. The PDDCH or PDSCH resource may be allocated to overlap at least a part or all of the PUCCH resource in terms of frequency, or may be allocated to a resource region different from the PUCCH resource.

In one embodiment among various embodiments of the disclosure, a case, in which a downlink symbol 634 is allocated to fully overlap in terms of frequency, will be described. In this case, the following methods may be used for PUCCH repetitive transmission 630 and 632.

Method 3-1: PUCCH Transmission Resource Allocation Based on Including Downlink Symbol According to method 3-1, the base station may inform of a length of a PUCCH transmission resource region regardless of a downlink symbol when allocating a PUCCH transmission resource. Therefore, the terminal may determine that the PUCCH is transmitted at symbols remaining after excluding symbols actually used for downlink Here, the downlink may include a semi-static downlink symbol (semi-static DL symbol) or may be include a dynamically indicated downlink symbol (dynamically indicated DL symbol(s)) (via format 2_0).

For example, in reference numeral 620 of FIG. 6A, a starting symbol index scheduled by the base station to support PUCCH repetitive transmissions 630 and 632 is 9, and a symbol length is 9. Therefore, a first PUCCH resource 630 transmission may have a length of 4 symbols in slots 622 and 624 preceding a slot boundary, and a second PUCCH resource 632 transmission may have a length of 2 symbols except for a downlink symbol 634 having a length of 3 symbols in slot 626 subsequent to the slot boundary. For example, a symbol length of 9 may include a first PUCCH resource 630 length of 4, a downlink symbol length of 3, and a second PUCCH 634 length of 2.

Method 3-2: PUCCH transmission resource allocation including only valid uplink symbol According to method 3-2, when allocating a PUCCH transmission resource, the base station informs of a length of a resource region in which actual PUCCH transmission is performed, except for the downlink symbol. The terminal determines that the PUCCH is transmitted at symbols remaining after excluding symbols actually used for downlink. For example, the downlink may include a semi-static DL symbol or may include a dynamically indicated DL symbol(s) (via format 2_0).

For example, in reference numeral 620 of FIG. 6A, a starting symbol scheduled by the base station to support PUCCH repetitive transmissions 630 and 632 is 9, and a symbol length is 6. Therefore, the first PUCCH resource 630 transmission has a length of 4 symbols in slot 624 preceding the slot boundary, and the second PUCCH resource 632 transmission has a length of 2 symbols from a fourth symbol, at which an uplink resource starts first, subsequent to the slot boundary. For example, the entire PUCCH symbol length 6 includes the first PUCCH resource 630 length of 4 and the second PUCCH 632 length of 2. The first PUCCH resource 630, the second PUCCH resource 632, and at least one downlink symbol 634 may be determined based on slot boundary information, symbol information (e.g., a downlink symbol, an uplink symbol, or a flexible symbol) determined via a higher layer message or signal L1, slot format indicator information, and the like.

FIG. 6B is a diagram illustrating a method for repeatedly transmitting a PUCCH according to an embodiment of the disclosure.

As described above, if a PUCCH is repeatedly transmitted according to a slot boundary or DL/UL switching, a PUCCH format or a PUCCH format group may be determined according to a length of an actually repeatedly transmitted PUCCH.

Referring to FIG. 6B, in S610, a terminal may receive PUCCH format information of a base station or configuration information associated with a repetition of PUCCH transmission. As described above, the information may be indicated by DCI or configuration information transmitted via an RRC layer or a combination of the information, and detailed descriptions is omitted.

In S620, the terminal may identify a PUCCH format (e.g., a first PUCCH format) indicated by the base station, and may identify an allocated PUCCH repetitive transmission resource.

The terminal may determine in S630 whether the PUCCH repetitive transmission resource crosses a slot boundary. The terminal may determine whether to change the PUCCH format, based on the determination.

If the PUCCH repetitive transmission resource does not cross the slot boundary, the terminal may apply the same PUCCH format in S640.

On the other hand, if the PUCCH repetitive transmission resource is allocated crossing the slot boundary, the terminal may determine, in S650, the PUCCH format based on a resource segmented by the slot boundary (e.g., a resource adjacent before and after the slot or a resource allocated subsequent to the slot). The terminal may apply the same PUCCH format (e.g., a first PUCCH format) or may apply a different PUCCH format (e.g., a second PUCCH format).

The same method may be applied to PUCCH repetitive transmission segmented by DL/UL switching, in addition to PUCCH repetitive transmission segmented by the slot boundary described above.

UCI information in the PUCCH repeatedly transmitted by the described different PUCCH formats are all the same. Specifically, if a length of an actually transmitted PUCCH is 4, the terminal is configured or indicated to use at least one of PUCCH formats 1, 3, and 4 via a higher signal or DCI (or signal L1), and if a PUCCH length is 2 or shorter, the terminal may be configured or indicated to use at least one of PUCCH formats 0 and 2 among PUCCH formats via a higher signal of DCI (or signal L1). It may also be possible for the PUCCH format to be implicitly determined based on the number of UCI bits, a frequency resource amount, a scheduled DCI format, and the like, in addition to the higher signal or signal L1.

If a PUCCH resource having a symbol length of 3 among actually repeatedly transmitted PUCCHs is allocated over the symbol boundary, the terminal may drop information to be transmitted in a corresponding resource or may perform repetitive transmission using at least one of PUCCH formats 0 and 2 having a length of 1 or 2. For example, with respect to PUCCH transmission having a length of 3, the terminal may perform repetitive transmission in PUCCH format 0 having lengths of 1 and 2. Alternatively, it may be sufficiently possible to apply the PUCCH format having a length of 3 to a method other than the above method. For example, new PUCCH format x including a length of 3 symbols may be applicable instead of repetitive transmission of PUCCHs (e.g., PUCCH format 0 and 2) including the length 1 or 2 described above.

Referring to FIGS. 6A and 6B, a frequency hopping method may include inter-slot frequency hopping and a segmented frequency hopping. In the inter-slot frequency hopping, if the repeatedly transmitted PUCCHs are positioned in different slots, the PUCCH transmissions have different frequency start positions.

In the segmented frequency hopping, if the scheduled PUCCH resource is segmented by DL/UL switching and the slot boundary according to reference numerals 600 to 620 as described in FIG. 6A, frequency hopping is performed for each segmented PUCCH resource. Specifically, if the segmented PUCCH transmission resources have multiple hops, PUCCH resources corresponding to even hops have the same frequency start position, and PUCCH resources corresponding to odd hops have the same frequency start position. It may be possible for the PUCCH resources of even hops and the PUCCH resources of odd hops to have different frequency start positions or the same frequency position.

Information on frequency hopping may be indicated via a higher signal or signal L1, and the information may include a symbol start position and length or a frequency start position and length of each hopped PUCCH. The described information may vary for each PUCCH format. Only one of the various frequency hopping methods described above may be used when actual PUCCH repetitive transmission is performed. The method relating to group and sequence hopping described in FIG. 5A and FIG. 5B may be similarly applied to FIG. 6A and FIG. 6B. However, a difference between FIGS. 6A and 6B and FIGS. 5A and 5B is that the concept of nominal repetition does not exist in FIG. 6A and FIG. 6B. Therefore, repetition for determining frequency hopping may be determined by the terminal based on actual repetition.

Figure 7:
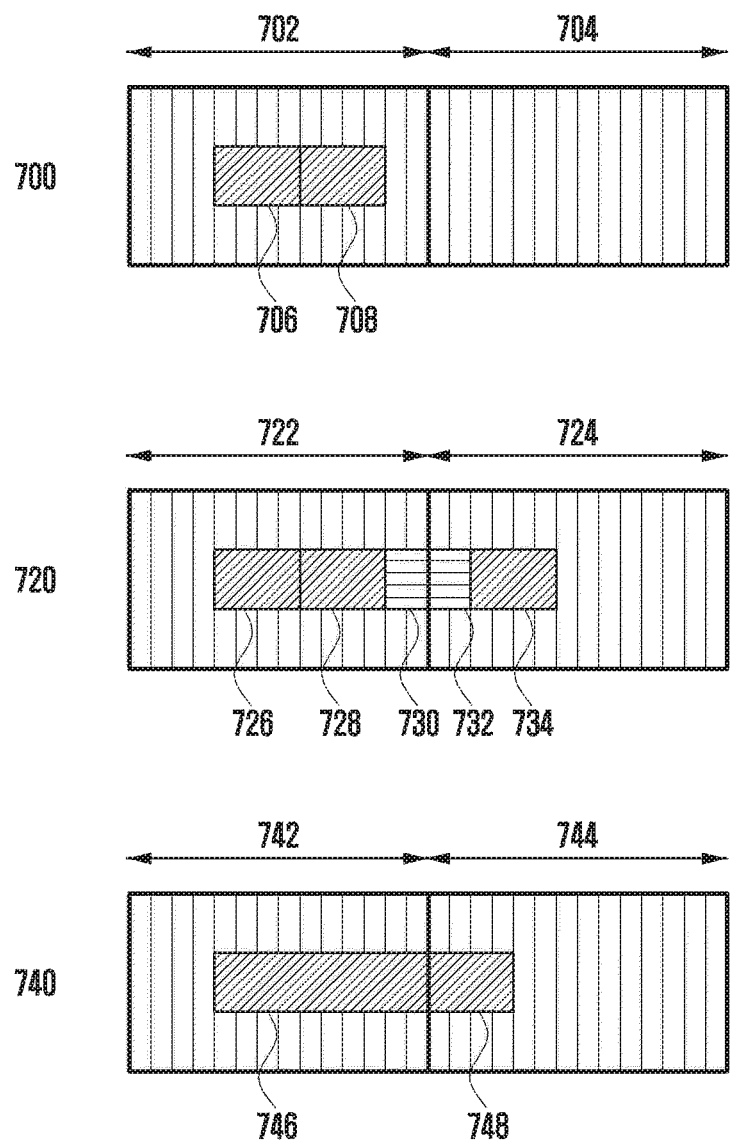
FIG. 7 is a diagram illustrating a method for repeatedly transmitting a PUCCH according to an embodiment of the disclosure.

FIG. 7 is a diagram illustrating a method for repeatedly transmitting a PUCCH according to an embodiment of the disclosure.

FIGS. 5A and 5B describe a case where the terminal repeatedly transmits control information via a PUCCH transmission resource having the same symbol length as that of consecutive uplink symbols for PUCCH transmission crossing a slot boundary. FIGS. 6A and 6B describe an embodiment of, if a PUCCH transmission resource is allocated for PUCCH transmission crossing a slot boundary and the PUCCH transmission resource crosses the slot boundary, determining, based on the slot boundary, a symbol length of a first PUCCH transmission resource preceding the slot boundary and a symbol length of a second PUCCH transmission resource subsequent to the slot boundary.

Referring to FIG. 7, a new method is proposed by combining the cases of FIGS. 5A, 5B, 6A, and 6B.

If a PUCCH transmission start symbol (S), a length (L), and the number of repetitive transmissions (K) are configured by a base station, a length of an allocated PUCCH resource does not cross a slot boundary; if the PUCCH resource starts within one slot and is positioned within a last symbol of the slot, the PUCCH resource follows method 1-1 described in FIG. 5B; and if crossing a slot boundary or if DL/UL switching exists, a method according to method 2-3 or the method disclosed in FIG. 6A may be considered.

For example, as shown in reference numeral 700 of FIG. 7, a case, in which a starting symbol index of PUCCH resources 706 and 708 transmitted in slots 702 and 704 is 4, and a starting symbol index of a repeatedly transmitted PUCCH is 8, may be possible. If a resource is allocated such that the PUCCH is repeatedly transmitted within the slot, the base station may transmit, to the terminal, a PUCCH transmission start symbol, a length, and information on the number of repetitive transmissions.

If PUCCH resources 726 and 728 crosses one slot boundary as shown in reference numeral 720 of FIG. 7, the base station may configure the PUCCH resource to start from a fourth symbol (S) in slot 722, to have a length of 16 (L), and to have the number of repetitive transmissions of 4 (K), as shown in method 2-3 described in FIG. 5B. In this case, each of PUCCH resources positioned in the last two symbols 730 in slot 722 and positioned in the first two symbols 732 in slot 724 may be configured or assumed to be configured to be repeatedly transmitted. If a symbol length for repetitive transmission is different (e.g., 2 OFDM symbols) from the first indication (e.g., 4 OFDM symbols), it may be understood that a PUCCH format different from a first indicated PUCCH format is indicated or implicitly indicated. Finally, the PUCCH resource having a residual symbol length of 4 in the PUCCH resource, for which a total length of 16 is configured, may include 4 symbols allocated in slot 722, like symbol 734, and the terminal may repeatedly transmit control information by using the resource. In the embodiment of the disclosure, a description is provided including an example in which the lengths of the symbols 730 and 732 configured to the slot boundary are 2, but a case, in which other values (e.g., 3, 4, and the like) are included depending on start positions or lengths of symbols, may also be considered sufficiently. Although an example, in which both segmented PUCCH resources are used for repetitive transmission, is provided, a method of transmitting the PUCCH by using only one of the segmented PUCCH resources and dropping PUCCH transmission via the remaining resource may be considered. In the above, PUCCH repetitive transmission based on a combination of methods 1-1 and 2-3 has been described, but a method of repeatedly transmitting the PUCCH via a combination of methods 1-1 and 1-2, methods 2-1 to 2-3, and methods 3-1 and 3-2 may be used.

For example, if the length of the PUCCH resource does not cross the slot boundary, the PUCCH may be repeatedly transmitted using method 1-1, as shown in reference numeral 700. On the other hand, as shown in reference numeral 740 of FIG. 7, in PUCCH transmission resource configuration information included in DCI, if a starting symbol index is 4 (S=4) in slot 742, a length is 14 (L=14), and the number of repetitive transmissions is 1 (K=1), the terminal may understand that a long PUCCH resource having a starting symbol index of 4 and a length of 8 and a PUCCH resource having a starting symbol index of 0 in subsequent slot 744 and a symbol length of 4 are allocated. In this case, the terminal may be regarded as performing PUCCH transmission a total of two times including an initial transmission 746 and a one-time repetitive transmission 748 in separated PUCCH resources 746 and 748. In this embodiment of the disclosure, a case in which a maximum length of symbol is 14 is described, but it may be considered that the maximum length of symbol is set to a value greater than 14.

In the various embodiments of the disclosure, the starting symbol index indicated according to control information transmitted from the base station may include an indicator or a value generated based on a symbol length value and a distance from a last symbol of the PDSCH to a start symbol of the PUCCH resource.

Although the above description shows the case where the symbol length L for PUCCH transmission is mainly 2 and 4 OFDM symbols, expansion to 3 OFDM symbols may also be sufficiently available. To this end, an additional PUCCH format may be further considered.

Figure 8:
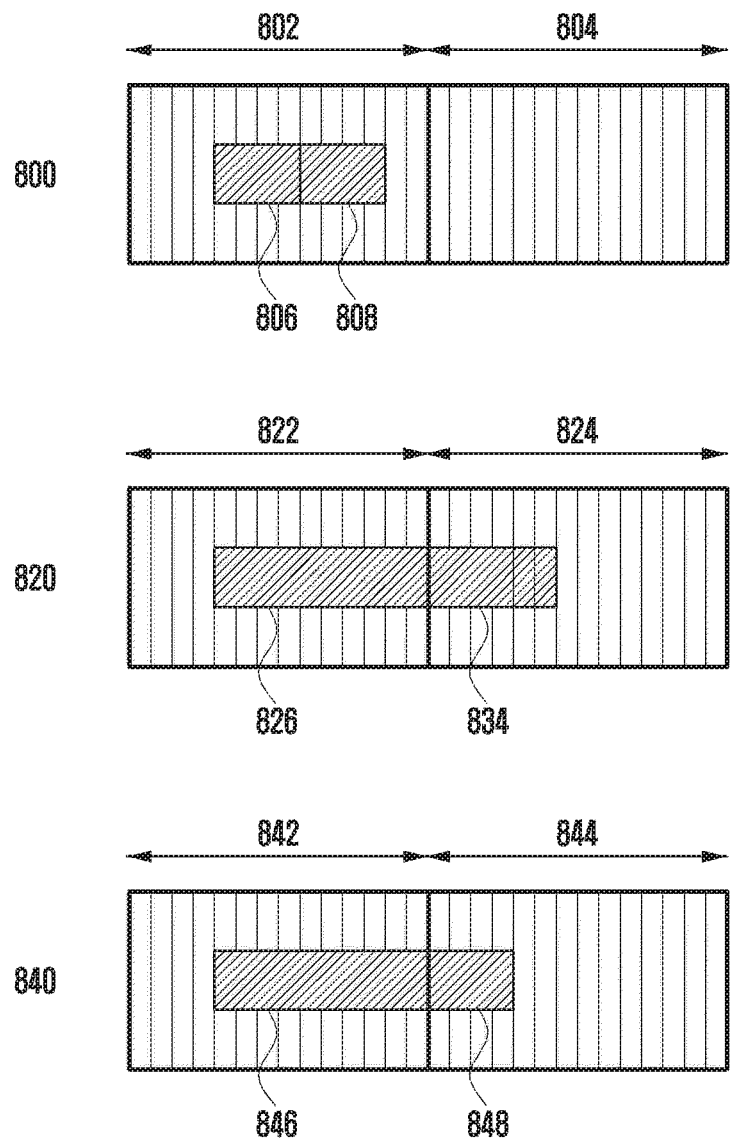
FIG. 8 is a diagram illustrating a method for repeatedly transmitting a PUCCH according to an embodiment of the disclosure.

FIG. 8 is a diagram illustrating a method for repeatedly transmitting a PUCCH according to an embodiment of the disclosure.

Referring to FIG. 8, a new method is proposed by combining the cases of FIGS. 5A, 5B, 6A, and 6B, which is different from that in FIG. 7.

If a PUCCH transmission start symbol (S), a length (L), and the number of repetitive transmissions (K) are configured by a base station, a length of an allocated PUCCH resource does not cross a slot boundary; if the PUCCH resource starts within one slot and is positioned within a last symbol of the slot, the PUCCH resource follows method 1-1 described in FIG. 5B; and if crossing a slot boundary or DL/UL switching exists, a length of the entire resource may be determined based on a symbol length and the number of transmissions, and it may be considered that one repetitive transmission occurs based on the slot boundary.

Referring to FIG. 8, if a PUCCH transmission start symbol is 4 (S=4), a length is 4 (L=4), and the number of repetitive transmissions is 2 (K=2), a case, in which a starting symbol index of PUCCH resources 806 and 808 transmitted in slots 802 and 804 is 4, and a starting symbol index of the repeatedly transmitted PUCCH is 8, may be possible as shown in reference numeral 800 of FIG. 8. If a resource is allocated such that the PUCCH is repeatedly transmitted within the slot, the base station may transmit, to the terminal, a PUCCH transmission start symbol, a length, and information on the number of repetitive transmissions.

As shown in reference numeral 820 of FIG. 8, the base station may perform configuration for PUCCH transmission so that PUCCH transmission starts from a fourth symbol (S), a length is 4 (L), and the number of repetitive transmissions is 4 (K). Unlike the example of FIG. 7, if resources allocated for PUCCH repetitive transmission cross a boundary via one slot, the terminal and the base station may interpret the number of repetitive transmissions (K) as a value for configuration of a resource length rather than considering the same as the actual number of transmissions, and actual transmission may be repeated once in each slot and repetitive transmission may be performed. For example, the terminal may determine whether the PUCCH resource for repetitive transmission crosses a slot boundary, by calculating a start position of symbol, a symbol length, and the number of repetitions, and may determine that 10 symbol resources 826 are allocated in a first slot 822 for PUCCH transmission, and 6 symbol resources 834 are allocated in the remaining slots 824 for PUCCH repetitive transmission. In the embodiment of the disclosure, it is described that the PUCCH allocation resource ends within a second slot, but in other embodiments of the disclosure, the PUCCH resource may be configured to be allocated even after a third slot based on a position of S and a case where L>14. In this case, the terminal may transmit the PUCCH three times via each slot.

Alternatively, as shown in reference numeral 840 of FIG. 8, in PUCCH transmission resource configuration information included in DCI, if a starting symbol index is 4 (S=4) in slot 842, a length is 14 (L=14), and the number of repetitive transmissions is 1 (K=1), the terminal may understand that a long PUCCH resource 846 having a starting symbol index of 4 and a length of 8 and a PUCCH resource 848 having a starting symbol index of 0 in subsequent slot 844 and a symbol length of 4 are allocated. In this case, the terminal may be regarded as performing transmission a total of two times including an initial transmission 846 and a one-time repetitive transmission 848 in separated PUCCH resources 846 and 848. This is merely an example, and in a TDD environment, two or more repetitive transmissions may occur. In this embodiment of the disclosure, a case in which a maximum length of symbol is 14 is described, but it may be considered that the maximum length of symbol is set to a value greater than 14. Unlike the embodiments of slot 800 in which a short PUCCH resource is repeatedly configured and slot 820 in which a long PUCCH resource is repeatedly configured, slot 840 shows a case in which a long PUCCH resource and a short PUCCH resource are configured together.

In the various embodiments of the disclosure, the starting symbol index indicated according to control information transmitted from the base station may include an indicator or a value generated based on a symbol length value and a distance from a last symbol of the PDSCH to a start symbol of the PUCCH resource.

Although the above description shows the case where the symbol length L for PUCCH transmission is mainly 4 OFDM symbols, expansion to 3 OFDM symbols may also be sufficiently available. To this end, an additional PUCCH format may be further considered.

Figure 9:
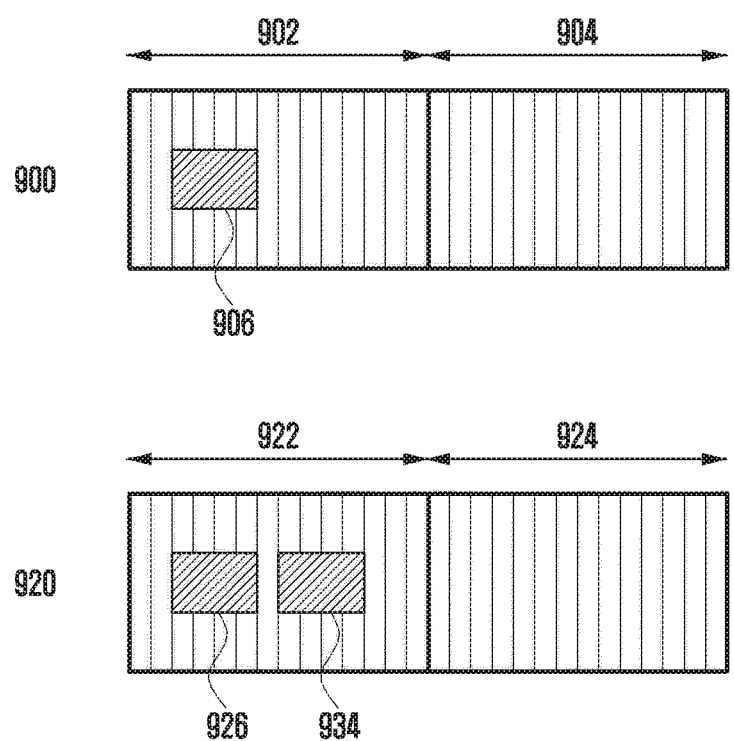
FIG. 9 is a diagram illustrating a method for repeatedly transmitting a PUCCH according to an embodiment of the disclosure.

FIG. 9 is a diagram illustrating a method for repeatedly transmitting a PUCCH according to an embodiment of the disclosure.

FIG. 9 describes a non-contiguous PUCCH resource allocation method.

General PUCCH resource allocation information (PUCCH resource) may be configured via RRC signaling as shown in Table 10 below. The single PUCCH resource allocation information may include at least one of a PUCCH start symbol, a length, and a PUCCH format type. A base station may configure a combination of three pieces of information as a set of PUCCH resource allocation information and may indicate the same to a terminal. The set of PUCCH resource allocation information may be indicated via index information.

Referring to FIG. 9, in reference numeral 900, in order to allocate a first PUCCH 906 resource of slots 902 and 904, the base station may configure information shown in Table 10 below as PUCCH resources and map the information to each index. The base station may transmit an index indicating one of the PUCCH resources to the terminal via higher layer signaling or DCI. Alternatively, all the PUCCH resources configured via higher layer signaling may be used. Here, the PUCCH resources may include information, such as a position of a starting symbol, a symbol length, a PUCCH format type, and the like. Information first considered in a single PUCCH transmission may additionally include parameters and values indicating repetitive transmission. The included values may be included in the form of an element in the table, or may be associated in the form of a separate independent element. The purpose of the association may be considered to prevent incurring resource waste, by configuring the element together on the table.

TABLE 10

| Index | PUCCH resource | Example |
|---|---|---|
| 1 | Resource 1 (Starting symbol, Length, Type) | S = 2, L = 4 Type = format 1 |
| 2 | Resource 2 | . . . |
| . . . | . . . | . . . |

As a method of configuring a plurality of PUCCH resource allocations, a method of expansion based on information in the table may be considered.

In an embodiment of the disclosure, the base station may configure multiple pieces of PUCCH resource allocation information so as to allocate non-contiguous PUCCHs. As shown in Table 11, PUCCH resource allocation information may be configured to include at least two sets of starting symbols, lengths, and format types.

Referring to reference numeral 920 of FIG. 9, in a first PUCCH resource, the PUCCH transmission start symbol may be configured to be 2 (S=2), the length is configured to be 4 (L=4), and the PUCCH format type may be configured to be 1. For PUCCH repetitive transmission, PUCCH resources 926 and 934 transmitted in slots 922 and 924, in which the start symbol is configured to be 7 (S=7), the length is configured to be 4 (L=4), and the PUCCH format type is configured to be 1, may be allocated. A new resource configuration for configuring two pieces of the PUCCH resource allocation information into a single set may be displayed as {(2, 4, format 1), (7, 4, format 1)}, and may enable mapping the same to a new index. It is described that the starting symbol for PUCCH resource allocation is counted from a first symbol of the indicated or designated slot. However, according to various embodiments of the disclosure, a method of counting a distance from a last symbol of a PDSCH to a start symbol of a PUCCH resource is also possible.

For example, as a method of indexing and configuring PUCCH resources, a start position of a symbol may be firstly considered and indexed. For example, a symbol starting at symbol 0 may be indexed first, and a symbol starting from symbol 1 may be indexed subsequently.

As another example, a method of indexing PUCCH resources may include prioritizing and indexing PUCCH resources by considering a symbol length. For example, a symbol with a shortest symbol length or a symbol with a longest symbol length may be indexed first, and then the remaining symbols are indexed sequentially.

As another example, a method of prioritizing a PUCCH format type and indexing PUCCH resources accordingly may be considered first so as to perform indexing. For example, indexing may be performed as PUCCH format 0, 1, 2, 3, 4, . . . , and the like, or indexing may be performed by division into short PUCCH format types, such as 0 and 2, and long PUCCH format types, such as 1, 3 and 4.

TABLE 11

| Index | PUCCH resource | Example |
|---|---|---|
| 1 | Resource 1 (multiple starting symbol, multiple length, multiple type) | (S, L, T) = {(2, 4, format 1), (7, 4, format 1)} |
| 2 | Resource 2 | . . . |
| . . . | . . . | . . . |

As another example, the base station allocates resources for multiple PUCCH repetitions, wherein additional information enabling configuration of a symbol gap may be further added to symbol start position, symbol length, and PUCCH format information. It is described that the starting position is counted from a first symbol of a slot. However, according to various embodiments of the disclosure, it is also possible to count a distance from a last symbol of a PDSCH to a start symbol of a PUCCH resource. The information may include an explicit or implicit configuration method.

The configured symbol gap may be operated based on explicit signaling. The gap is represented by the number of OFDM symbols, such as 1, 2, 3, 4, . . . , and the like, and if the gap is configured to 1, it may be understood that one OFDM symbol is included between repetitions of PUCCH resources allocated by default. If the number of repetitions is greater than 3 (K>3), it may be understood that an interval between a first allocated PUCCH resource and a second allocated PUCCH resource, and an interval between the second allocated PUCCH resource and a third allocated PUCCH resource may be one OFDM symbol. Alternatively, it may be understood that the interval between the first allocated PUCCH resource and the second allocated PUCCH resource is one OFDM symbol, and no gap is included in the second allocated PUCCH resource and the third allocated PUCCH resource.

As another example, the base station may allocate multiple PUCCH transmission resources including a length of a symbol gap. The symbol gap may be configured based on explicit signaling. The gap may include one element of Table 10. The above example may have an effect of reducing the number of bits indicating a position of a starting symbol.

As another example, when the base station allocates a PUCCH transmission resource, allocation of the resource for PUCCH repetitive transmission may be dependent on a characteristic of a PDCCH or a resource type. The characteristic of the PDCCH may include semi-static DL symbol(s) or dynamically indicated DL symbol(s) (via format 2_0).

The terminal may perform different interpretations according to operations of the base station.

For example, the terminal may not expect that there will be a PUCCH repetitive transmission resource that collides with the semi-static DL symbol(s). Therefore, the terminal may expect that there will be no urgent (dynamic) downlink allocation for the PUCCH repetitive transmission resource, and the base station side performs scheduling so that there is no collision.

Alternatively, the terminal may not perform PUCCH repetitive transmission when colliding with the semi-static DL symbol(s). In this case, the terminal side may expect that there will be an urgent (dynamic) downlink allocation for the PUCCH repetitive resource so as to prepare repetitive transmission, and the base station side may perform configuration so that the semi-static DL symbol(s) and the PUCCH repetitive resource overlap during the scheduling operation.

For the base station, the counts of a total number of repetitions of PUCCH transmissions in resources allocated for PUCCH repetition transmissions may differ in the two embodiments. If the semi-static DL symbol(s) and the PUCCH resource are not expected to collide, since it is known that a resource will not be allocated, the symbol does not affect the count. On the other hand, if collision is expected with the semi-static DL symbol(s) (vice-versa), a resource for PUCCH repetitive transmission may also be allocated to a resource colliding with the semi-static DL symbol(s). In this case, the base station may include the semi-static DL symbol(s) in the number of repetitions (K) or the symbol length (L).

For the terminal, operations of increasing the number of PUCCH repetitive transmissions may be different in the two embodiments. Specifically, if it is not expected that there will be a resource for PUCCH repetitive transmission, the terminal may operate clearly so as not to increase the counter of repetitive transmissions. Conversely, if the PUCCH repetitive transmission is not performed during the collision, the counter of repetitive transmissions may not be increased or may be increased by one. This may be determined according to the terminal's performance of repetitive transmission.

The various embodiments have described the case of a semi-static DL symbol(s) as an example of a PDDCH, but expansion and operation may be sufficiently performed with a dynamically indicated DL symbol(s) (via format 2_0).

FIGS. 7, 8, and 9 described above are combinations of FIGS. 5A and 5B and FIGS. 6A and 6B, and various methods (e.g., frequency hopping, a transmission method, a resource allocation method, and the like) described in FIGS. 5A and 5B and FIGS. 6A and 6B may also be applied to each of FIGS. 7, 8, and 9.

For control information transmitted via the PDCCH of the disclosure, various schemes may be used to enhance performance of URLLC. Various improvement factors, such as a DCI format, CORESET, a search space, CCE, and a blind detection scheme, may be specified for the PDCCH.

For example, a new DCI format may be proposed for the purpose of improving URLLC. For example, a scheme of expansion from an existing format, such as DCI_format 1_2, is possible. Alternatively, although new DCI does not exist, a separate RNTI for the terminal supporting a URLLC service may be proposed in addition to an existing RNTI.

As another example, in order to improve URLLC, the DCI format may support configurable sizes unlike existing rel-15. DCI of rel-15 is designed to be suitable for an eMBB or a universal type structure. On the other hand, for improved DCI, the size of a field that is unnecessary or lacks usability may be changed so as to be suitable for URLLC.

Specifically, a maximum size of DCI of rel-16 may be smaller than rel-15 fallback DCI, and a minimum size may be reduced by 10-16 bits than rel-15 fallback DCI. In order to supervise the DCI field, the size of information included in existing DCI may be partially reduced.

The DCI field may include an antenna port(s) [0-2 bits], a transmission configuration indication [0-3 bits], a rate matching indicator [0-2 bits], an SRS request [0-3 bits], a PRB bundling size indicator [0-1 bit], a carrier indicator [0-3 bits], a CSI request [0-3 bit], ZP CSI-RS triggering [0-2 bits], a beta offset indicator [0-2 bits], an SRS resource indicator [0-4 bits], a repetition factor [0-2 bits], a priority indication [0-3 bits], and the like.

In a DCI field size for rel-16, zero padding may be supported to align the size with rel-15 fallback DCI. A DCI field for scheduling rel-16 URLLC may not include a specific field of rel-15 DCI format 1_1, or the specific field may be configured to 0 bits. The specific field may include MCS, NDI, RV, CBG transmission information, CGB flushing, and the like, present for at least TB2. However, fields for 1 bit for NDI and a DCI format indicator 1 bit may remain unchanged. As another example, the DCI field for scheduling rel-16 URLLC may not include a specific field of rel-15 DCI format 0_1, or the specific field may be configured to 0 bit.

As another example, additional CORESET or expansion of a search space may be considered for the purpose of improving URLLC. Currently, in rel-15, there are 3 CORESETs in one BWP in one cell, and 10 search spaces may be configured in one slot. However, the CORESET or search space may be additionally configured (e.g., CORESET 4 and search space 12) to be suitable for URLLC. Alternatively, a specific CORESET and search space region for URLLC transmission may be indicated within the same number of CORESETs and search spaces.

The DCI added or modified to schedule the rel-16 URLLC described above may support PUCCH repetitive transmission described in FIG. 5B to FIG. 9. Alternatively, even in the same DCI format, the DCI transmitted in the CORESET, search space, or BWP configured for a rel-16 URLLC terminal may support PUCCH repetitive transmission described in FIG. 5B to FIG. 9.

Various embodiments for configuration of PUCCH repetitive transmission resources have been described with reference to FIG. 5B to FIG. 9. Here, a case, in which various PUCCH repetitive transmission resources are allocated regardless of a DCI format, is illustrated. For example, a downlink control channel may indicate PUCCH allocation according to one rule determined by the standard. However, in various embodiments described in FIG. 5B to FIG. 9, an optimal method may be determined differently according to a scheduling method of the base station. Accordingly, the scheduling scheme may be designated in the format of downlink control information, such as a DCI format. For example, various PUCCH repetitive transmission resource allocation methods may be associated or determined based on the DCI format.

For example, the methods of the above embodiments may be configured according to a DCI format type of a downlink control channel. Specifically, DCI format 1_0 may follow method 1-1 (a PUCCH transmission start symbol, a length, and the number of repetitive transmissions) described in FIG. 5B, and DCI format 1_1 may follow method 1-2 (a start symbol and length for each PUCCH repetitive transmission). Unlike this, each of a DCI format (DCI format 1_0, DCI format 1_1) for DL and a DCI format (DCI format 0_0, DCI format 0_1) for UL may be classified based on HARQ-ACK as well as other UCI types.

For example, in a situation where rel-15 supports PUCCH repetitive transmission in a slot unit, and rel-16 supports PUCCH repetitive transmission in a unit smaller than a slot according to FIG. 5B to FIG. 9 described above, if the terminal supports both rel-15 and rel-16, the terminal may determine that PUCCH information detected in DCI for scheduling based on rel-15 supports PUCCH repetitive transmission in a slot unit, and the terminal may consider that PUCCH information detected in DCI for scheduling based on rel-16 supports PUCCH repetitive transmission in a unit smaller than the slot described above in FIG. 5B to FIG. 9. The DCI for scheduling based on rel-15 may be DCI format 0_0, 0_1, 1_0, or 1_1, and the DCI for scheduling based on rel-16 may be DCI format 0_x or 1_x (x is a value(s) other than 0 or 1).

As another example, a higher signal related to a PUCCH repetitive transmission configuration in a slot unit may be applied only to DCI format 0_1 or 1_1, and a higher signal related to a PUCCH repetitive transmission configuration in a unit smaller than a slot is applied to DCI format 0_x or 1_x (x is a value(s) other than 0 or 1). In summary, the higher signal related to the PUCCH repetitive transmission configuration in a slot unit and the higher signal related to the PUCCH repetitive transmission configuration in a unit smaller than a slot may be applied to different DCI formats, and may be applicable to each different CORESET, search space, or BWP.

In another example, as a result of decoding the downlink control channel, if the terminal determines that a DCI format is for eMBB, it may be determined to follow method 1-1 of FIG. 5B and method 3-1 (PUCCH transmission resource allocation considering to include a downlink symbol at signaling) of FIG. 6A, and if the terminal determines that a DCI format is for URLLC, it may be determined to follow method 1-2 in FIG. 5B and method 3-2 (PUCCH transmission resource allocation including only a valid uplink symbol) in FIG. 6A. The opposite case (vice versa) may also be possible. As a method for determining an eMBB or URLLC DCI format, the terminal may perform classification using an RNTI or DCI format scrambled to a CRC of DCI, or a specific field in DCI. However, the above combination is merely one embodiment of the disclosure, and all combinations of the above-described methods are possible.

As another example, the base station may indicate a specific CORESET and search space region for URLLC transmission, wherein configuration may be performed so as to distinguish a separate CORESET or search space for allocation of a PUCCH repetitive transmission resource configuration. For example, in a situation where CORESET 1 and CORESET 2 exist, DCI detected in CORESET 1 may indicate PUCCH repetitive transmission of A times, and DCI detected in CORESET 2 may indicate PUCCH repetitive transmission of B times. For example, for each CORESET or search space, PUCCH repetitive transmission may always have a fixed value or a value individually configured via a higher signal.

In a specific CORESET or search space in which the terminal has successfully perform decoding, a specific CORESET and search space region for URLLC transmission may be indicated.

Accordingly, for a method of connecting rules of various embodiments described FIG. 5B to FIG. 9 and the DCI format, many combinations are possible and the method is not limited by a specific case.

Figure 10:
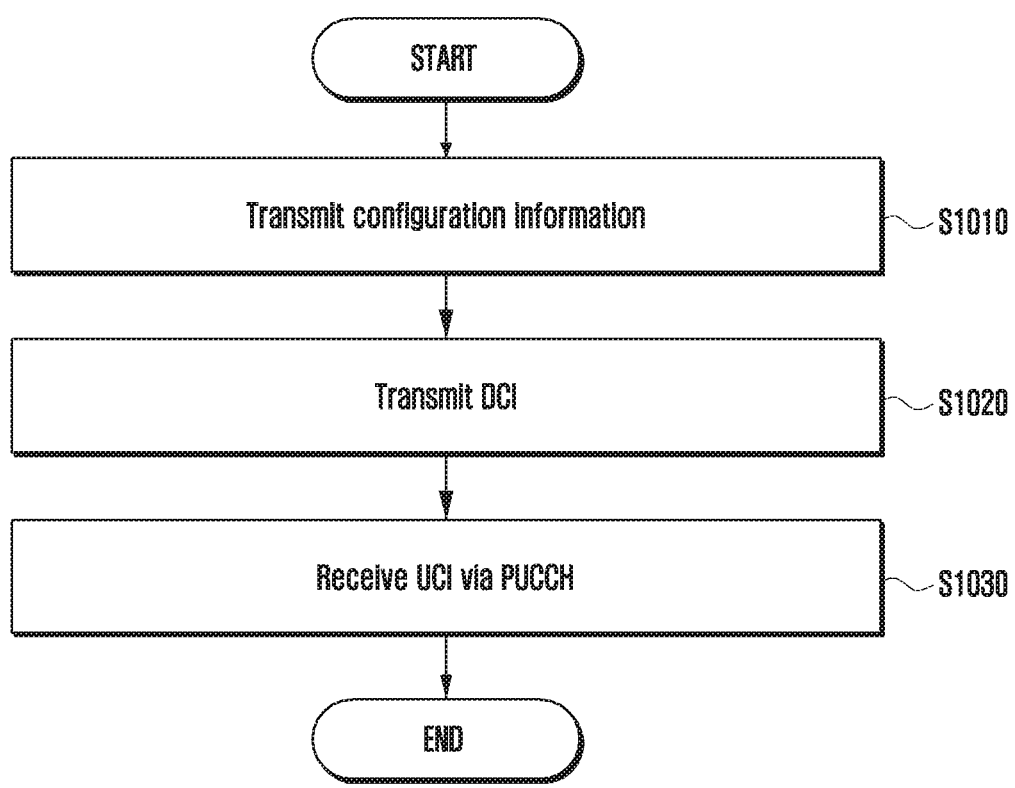
FIG. 10 is a diagram illustrating an operation of a base station according to an embodiment of the disclosure.

FIG. 10 is a diagram illustrating an operation of a base station according to an embodiment of the disclosure.

Referring to FIG. 10, in operation S1010, a base station may transmit configuration information to a terminal. The base station may transmit the configuration information via a higher layer (e.g., RRC signaling). The configuration information may include PUCCH resource allocation information, and details are the same as described above.

Thereafter, the base station may transmit DCI to the terminal in operation S1020. The DCI may include resource allocation information for transmitting downlink data. The DCI may include information for reception of uplink control information. For example, the DCI may include information indicating a channel PUCCH for transmitting control information, and details are the same as described above. Therefore, the base station may transmit data to the terminal based on the DCI.

Thereafter, the base station may receive the uplink control information in operation S1030. The uplink control information may include CSI, an SR, HARQ-ACK information, and the like. As described in FIG. 5B to FIG. 9 of the disclosure, the terminal may repeatedly transmit the control information via PUCCH, and the base station may repeatedly receive the uplink control information.

A method of the repetitive transmission is the same as described above and will be thus omitted below.

The method of a base station according to FIG. 10 includes: transmitting configuration information including PUCCH resource information; transmitting downlink control information; and repeatedly receiving identical uplink control information in a PUCCH resource including consecutive symbols, which is determined based on the downlink control information and the configuration information.

Figure 11:
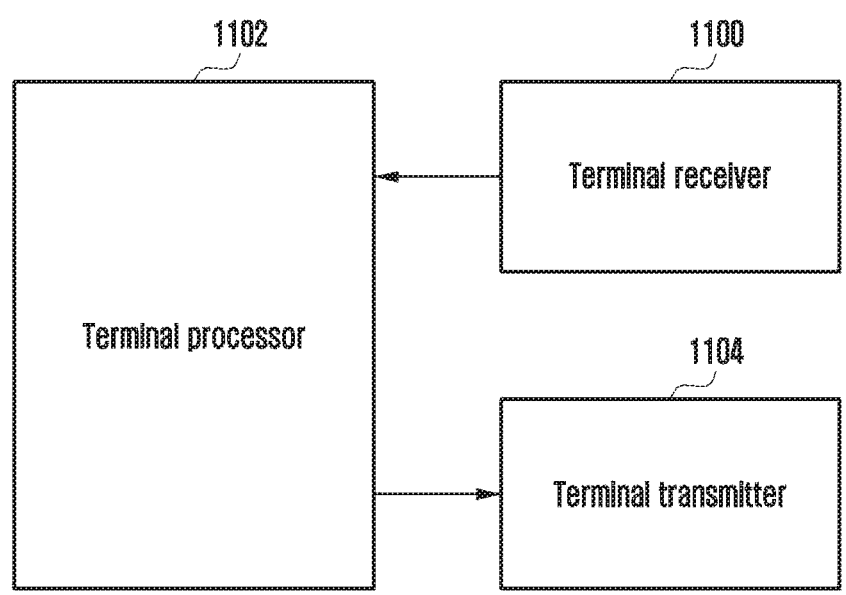
FIG. 11 is a block diagram illustrating a structure of a terminal according to an embodiment of the disclosure.

FIG. 11 is a block diagram illustrating a structure of a terminal according to embodiments of the disclosure.

Referring to FIG. 11, a terminal of the disclosure may include a terminal receiver 1100, a terminal transmitter 1104, and a terminal processor 1102.

A terminal receiver 1100 and a terminal transmitter 1104 may collectively be referred to as a transceiver. The transceiver may transmit a signal to or receive a signal from the base station. The signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, and the like. Further, the transceiver may receive a signal via a radio channel, may output the signal to a terminal processor 1102, and may transmit the signal output from the terminal processor 1102, via the radio channel.

The terminal processor 1102 may control a series of procedures so that the terminal may operate according to the above-described embodiments.

Figure 12:
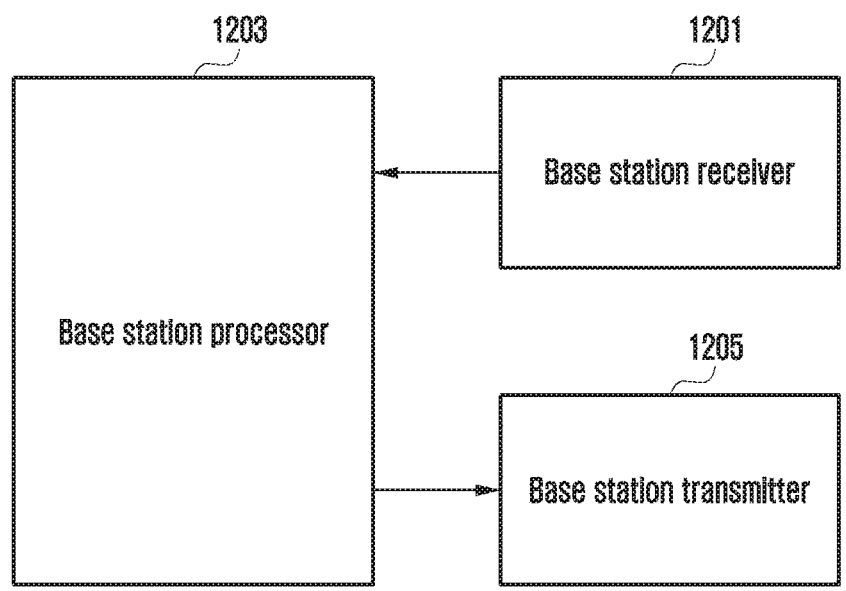
FIG. 12 is a block diagram illustrating a structure of a base station according to an embodiment of the disclosure.

FIG. 12 is a block diagram illustrating a structure of a base station according to an embodiment of the disclosure.

Referring to FIG. 12, in an embodiment of the disclosure, a base station may include at least one of a base station receiver 1201, a base station transmitter 1205, and a base station processor 1203.

The base station receiver 1201 and the base station transmitter 1205 may collectively be referred to as a transceiver. The transceiver may transmit a signal to or receive a signal from the terminal. The signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, and the like. Further, the transceiver may receive a signal via a radio channel, may output the signal to the base station processor 1203, and may transmit the signal output from the base station processor 1203 via the radio channel.

The base station processor 1203 may control a series of procedures so that the base station operates according to the above-described embodiment of the disclosure.

In the drawings in which methods of the disclosure are described, the order of the description does not always correspond to the order in which operations of each method are performed, and the order relationship between the operations may be changed or the operations may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

The embodiments of the disclosure described and shown in the specification and the drawings have been presented to easily explain the technical contents of the disclosure and help understanding of the disclosure, and are not intended to limit the scope of the disclosure. For example, it will be apparent to those skilled in the art that other modifications and changes may be made thereto based on the technical spirit of the disclosure. Further, the above respective embodiments may be employed in combination, as necessary. For example, embodiments 1, 2, and 3 of the disclosure may be partially combined to operate a base station and a terminal. Further, although the above embodiments have been described by way of the NR system, other variants based on the technical idea of the embodiments may be implemented in other systems, such as FDD and time-division duplex (TDD) LTE systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
receiving, from a base station, physical uplink control channel (PUCCH) configuration information including a number of slots for repetition of a PUCCH transmission and a length of a subslot for a PUCCH, the length of the subslot is set to one of 2 symbols or 7 symbols;
receiving, from the base station, downlink control information (DCI);
receiving, from the base station, data on a physical downlink shared channel (PDSCH) based on the DCI; and
performing repetition of the PUCCH transmission with same uplink control information (UCI) over the number of slots,
wherein the PUCCH transmission is performed in symbols corresponding to the length of the subslot.

2. The method of claim 1, wherein the length of the subslot indicates a number of symbols in one of the slots.

3. The method of claim 1,
wherein the PUCCH configuration information includes information on PUCCH resource sets, and
wherein the DCI includes information indicating one of the PUCCH resource sets.

4. A method performed by a base station in a wireless communication system, the method comprising:
transmitting, to a terminal, physical uplink control channel (PUCCH) configuration information including a number of slots for repetition of a PUCCH transmission and a length of a subslot for a PUCCH, the length of the subslot is set to one of 2 symbols or 7 symbols;
transmitting, to the terminal, downlink control information (DCI);
transmitting, to the terminal, data on a physical downlink shared channel (PDSCH) based on the DCI; and
receiving, from the terminal, same uplink control information (UCI) over the number of slots based on repetition of the PUCCH transmission,
wherein the PUCCH transmission is performed in symbols corresponding to the length of the subslot.

5. The method of claim 4,
wherein the length of the subslot indicates a number of symbols in one of the slots.

6. The method of claim 4,
wherein the PUCCH configuration information includes information on PUCCH resource sets, and
wherein the DCI includes information indicating one of the PUCCH resource sets.

7. A terminal in a wireless communication system, the terminal comprising:
   a transceiver; and
   at least one processor configured to:
   receive, from a base station, physical uplink control channel (PUCCH) configuration information including a number of slots for repetition of a PUCCH transmission and a length of a subslot for a PUCCH, the length of the subslot is set to one of 2 symbols or 7 symbols,
   receive, from the base station, downlink control information (DCI),
   receive, from the base station, data on a physical downlink shared channel (PDSCH) based on the DCI, and
   perform repetition of the PUCCH transmission with same uplink control information (UCI) over the number of slots,
   wherein the PUCCH transmission is performed in symbols corresponding to the length of the subslot.

8. The terminal of claim 7, wherein the length of the subslot indicates a number of symbols in one of the slots.

9. The terminal of claim 7,
   wherein the PUCCH configuration information includes information on PUCCH resource sets, and
   wherein the DCI includes information indicating one of the PUCCH resource sets.

10. A base station in a wireless communication system, the base station comprising:
    a transceiver; and
    at least one processor configured to:
    transmit, to a terminal, physical uplink control channel (PUCCH) configuration information including a number of slots for repetition of a PUCCH transmission and a length of a subslot for a PUCCH, the length of the subslot is set to one of 2 symbols or 7 symbols,
    transmit, to the terminal, downlink control information (DCI),
    transmit, to the terminal, data on a physical downlink shared channel (PDSCH) based on the DCI, and
    receive, from the terminal, same uplink control information (UCI) over the number of slots based on repetition of the PUCCH transmission,
    wherein the PUCCH transmission is performed in symbols corresponding to the length of the subslot.

11. The base station of claim 10,
    wherein the length of the subslot indicates a number of symbols in one of the slots.

12. The base station of claim 10,
    wherein the PUCCH configuration information includes information on PUCCH resource sets, and
    wherein the DCI includes information indicating one of the PUCCH resource sets.

\* \* \* \* \*